(12) United States Patent
Toiyama

(10) Patent No.: US 8,875,217 B2
(45) Date of Patent: Oct. 28, 2014

(54) RECEIVER

(75) Inventor: Keiichi Toiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1364 days.

(21) Appl. No.: 12/444,723

(22) PCT Filed: Nov. 5, 2007

(86) PCT No.: PCT/JP2007/071466
§ 371 (c)(1),
(2), (4) Date: Apr. 8, 2009

(87) PCT Pub. No.: WO2008/056622
PCT Pub. Date: May 15, 2008

(65) Prior Publication Data
US 2010/0100923 A1    Apr. 22, 2010

(30) Foreign Application Priority Data
Nov. 6, 2006   (JP) .................................. 2006-299907

(51) Int. Cl.
*H04N 7/16* (2011.01)
*H04N 21/43* (2011.01)
*H04N 21/426* (2011.01)
*H04N 21/438* (2011.01)
*H04N 21/2368* (2011.01)
*H04N 21/434* (2011.01)
*H04N 21/2383* (2011.01)
*H04N 21/63* (2011.01)
*H04N 21/2365* (2011.01)
*H04N 21/439* (2011.01)
*H04H 20/26* (2008.01)

(52) U.S. Cl.
CPC ....... *H04N 21/2368* (2013.01); *H04N 21/4307* (2013.01); *H04N 21/42615* (2013.01); *H04N 21/4382* (2013.01); *H04N 21/4263* (2013.01); *H04N 21/4341* (2013.01); *H04N 21/4347* (2013.01); *H04H 2201/60* (2013.01); *H04N 21/2383* (2013.01); *H04N 21/631* (2013.01); *H04H 20/26* (2013.01); *H04N 21/2365* (2013.01); *H04N 21/4394* (2013.01)
USPC .......................................... 725/139; 725/151

(58) Field of Classification Search
None
See application file for complete search history.

(56) References Cited

U.S. PATENT DOCUMENTS 5,920,261 A * 7/1999 Hughes et al. ............. 340/568.8
6,266,536 B1 * 7/2001 Janky ............................ 455/503
(Continued)

FOREIGN PATENT DOCUMENTS

EP          1 233 556 A1    8/2002
JP        2000-184365 A    6/2000
(Continued)

OTHER PUBLICATIONS

International Search Report for PCT/JP2007/071466 dated Feb. 12, 2008.
(Continued)

*Primary Examiner* — Brian T Pendleton
*Assistant Examiner* — Jonathan V Lewis
(74) *Attorney, Agent, or Firm* — McDermott Will & Emery LLP

(57) ABSTRACT

A delay controller performs a delay control so as to stepwise increase a first delay amount in a first delay generator or second delay generator so as to minimize the delay amount of a video signal and an audio signal output from a first AV decoder and a second AV decoder. Thus, immediately after channel selection, the first video signal and the first audio signal or the second video signal and the second audio signal are output without a delay. This can provide a receiver capable of synchronizing the video signal output and the audio signal output between a plurality of receivable broadcast methods.

15 Claims, 19 Drawing Sheets

(56) References Cited

U.S. PATENT DOCUMENTS

| | | | |
|---|---|---|---|
| 6,356,309 B1 * | 3/2002 | Masaki et al. | 348/439.1 |
| 7,010,370 B1 * | 3/2006 | Riegelsberger | 700/94 |
| 7,079,194 B2 * | 7/2006 | Lee et al. | 348/724 |
| 7,376,476 B2 * | 5/2008 | Gatts | 700/94 |
| 7,580,612 B2 | 8/2009 | Sato et al. | |
| 7,671,926 B2 * | 3/2010 | Lee et al. | 348/642 |
| 7,830,968 B1 * | 11/2010 | Deiss et al. | 375/240.28 |
| 2002/0015108 A1 * | 2/2002 | Takashima et al. | 348/484 |
| 2002/0044528 A1 * | 4/2002 | Pogrebinsky et al. | 370/230 |
| 2002/0181560 A1 * | 12/2002 | Raman | 375/148 |
| 2002/0197053 A1 * | 12/2002 | Nakamura et al. | 386/35 |
| 2003/0226153 A1 * | 12/2003 | Bessel et al. | 725/152 |
| 2004/0233938 A1 * | 11/2004 | Yamauchi | 370/537 |
| 2006/0083315 A1 * | 4/2006 | Sato et al. | 375/240.25 |
| 2006/0156376 A1 * | 7/2006 | Mukaide et al. | 725/135 |
| 2006/0164563 A1 * | 7/2006 | Watanabe et al. | 348/731 |
| 2007/0011719 A1 * | 1/2007 | Lin | 725/139 |
| 2007/0091207 A1 * | 4/2007 | Aufranc et al. | 348/462 |
| 2008/0240165 A1 * | 10/2008 | Balassanian et al. | 370/503 |
| 2009/0096874 A1 * | 4/2009 | Hayashi et al. | 348/192 |

FOREIGN PATENT DOCUMENTS

| | | |
|---|---|---|
| JP | 2002-232792 A | 8/2002 |
| JP | 2002-232792 A | 8/2002 |
| JP | 2004-166173 A | 6/2004 |
| JP | 2004-312361 A | 11/2004 |
| JP | 2005-223548 A | 8/2005 |
| JP | 2006-13845 A | 1/2006 |
| JP | 2006-013845 A | 1/2006 |
| JP | 2006-074466 A | 3/2006 |
| JP | 2006-074466 A | 3/2006 |
| JP | 2006-115264 A | 4/2006 |
| JP | 2006/115264 A | 4/2006 |
| JP | 2006-270255 A | 10/2006 |
| JP | 2006-270824 A | 10/2006 |
| JP | 2006-295662 A | 10/2006 |

OTHER PUBLICATIONS

Supplemental Partial European Search Report for Application No. EP 07831199, May 18, 2011, Panasonic Corporation.

* cited by examiner

FIG. 7

Delay amount of first delay generator — 501

| Time (second) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Delay amount | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

Delay amount of second delay generator — 502

| Time (second) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Delay amount | 1 | 21 | 41 | 61 | 81 | 101 | 121 | 141 | 161 | 181 | 201 | 221 | 241 | 261 | 281 | 301 | 321 | 341 | 361 | 381 | 381 | 381 | 381 | 381 | 381 |

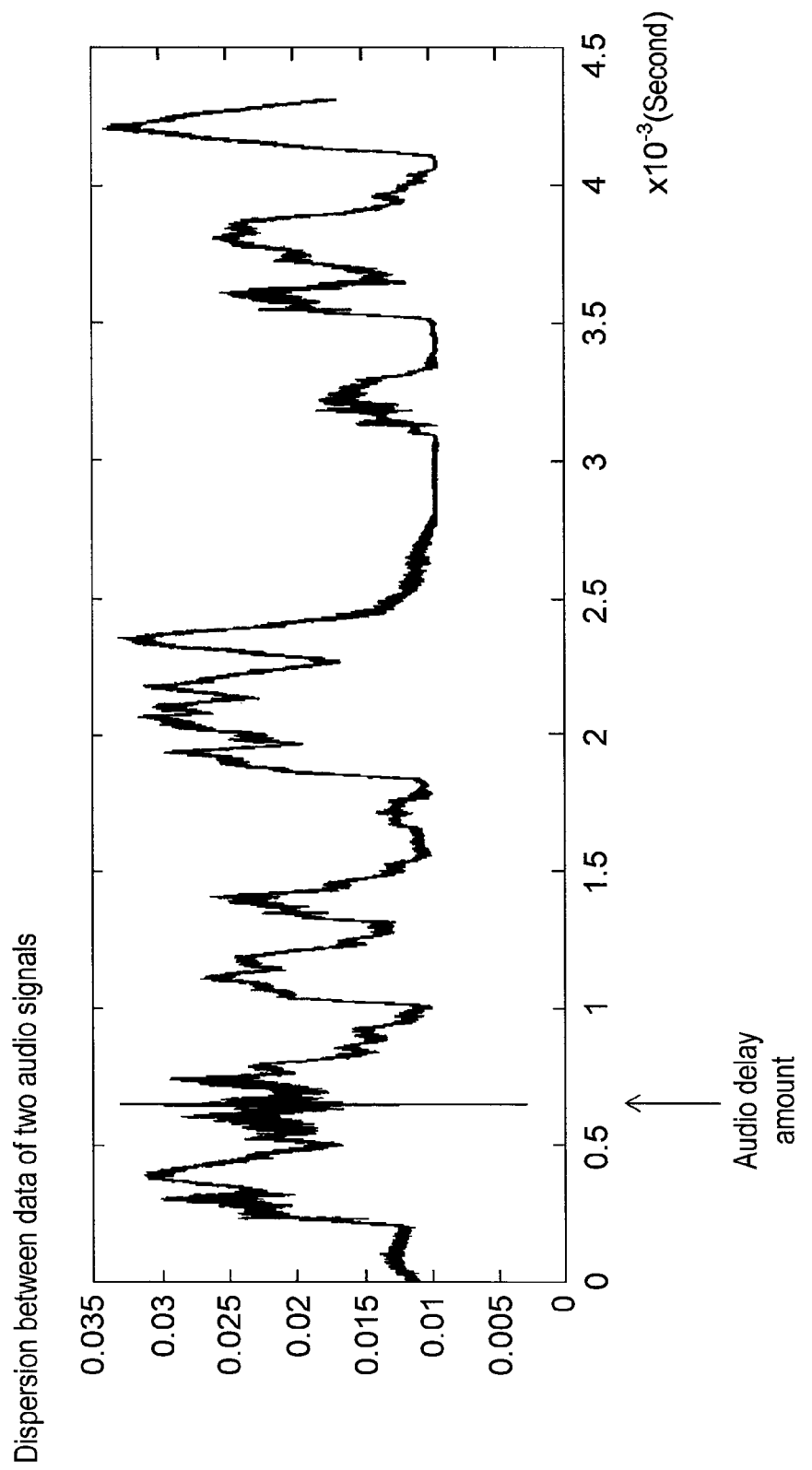

RECEIVER

THIS APPLICATION IS A U.S. NATIONAL PHASE APPLICATION OF PCT INTERNATIONAL APPLICATION PCT/JP2007/071466.

TECHNICAL FIELD

The present invention relates to a receiver for receiving digital broadcast or a transmission signal such as a video signal and an audio signal by a radio wave, and more particularly, it relates to a delay control of a video signal and an audio signal.

BACKGROUND ART

Terrestrial digital broadcast in Japan is designed so as to permit various broadcast services by dividing a band into 13 segments. For example, in some regions in the country, 12 segments of the divided 13 segments are used for broadcast for fixed receivers and remaining one segment is used for one-segment broadcast for portable terminals and mobile units. These two broadcast methods are sent in different modulation methods. For example, 12-segment broadcast uses 64 QAM having a high transmission efficiency and carries out high-definition broadcast, multi-channel transmission, and the like. On the other hand, one-segment broadcast uses QPSK having a low transmission efficiency but an excellent error resistance property. Currently, the 12-segment broadcast and the one-segment broadcast send the same contents. Then, equipment such as a vehicle-installed television capable of receiving both broadcasting methods receives broadcast by automatically switching between the 12-segment broadcast and the one-segment broadcast depending upon the receiving state.

However, even when these two broadcast methods send the same contents, time required for encoding processing and time required for decoding processing are different. Therefore, seamless switching cannot be realized only by simply switching the decoded outputs of the two broadcast methods. Then, senders and receivers have been proposed in which output timing of the two broadcast methods are made to be the same with the encoding and decoding times taken into consideration.

FIG. 20 is a block diagram showing a configuration of the above-mentioned conventional receiver (see, for example, patent document 1). A receiver shown in FIG. 20 includes demodulator 1901, first decoder 1902a, second decoder 1902b, delay unit 1903, synthesizer 1904, and display device 1905. A signal demodulated and error-corrected by demodulator 1901 is output to decoder 1902a and delay unit 1903. A signal delayed by delay unit 1903 is output to decoder 1902b. Video signals output from decoder 1902a and decoder 1902b are input into synthesizer 1904. Then, synthesizer 1904 evaluates the image qualities of the input video signals and determines which video signal of decoder 1902a or decoder 1902b is to be output to display device 1905 and carries out switching. Thus, it has been proposed that a signal is delayed for a certain time by using a delay unit, so that the delay amounts of the two broadcast methods are matched to each other.

Thus, in a conventional receiver, a video image having a smaller delay in the two broadcast methods is delayed so as to match a video signal and an audio signal to a video image having a larger delay. Therefore, even when the channel having a smaller delay is changed, an additional time is required until a video signal and an audio signal are output because of delay. Therefore, for example, at the time of searching for a desired program by sequentially changing channels, additional delay occurs every time the channel is changed. A user has to wait for the output of a video signal and an audio signal in order to confirm the contents of program every time the user changes a channel. Therefore, there has been a problem that it takes a long time to search for a desired program.
[Patent document 1] Japanese Patent Unexamined Publication No. 2002-232792.

SUMMARY OF THE INVENTION

The present invention provides a receiver capable of outputting a video signal and an audio signal without delay immediately after channel selection, and synchronizing the video signal output and the audio signal output between a plurality of receivable broadcast methods.

The receiver of the present invention includes a demodulation unit for demodulating a channel-selected signal, outputting a first transport stream signal and a second transport stream signal, and determining a receiving quality and outputting it as a receiving quality information signal; a first delay generator for delaying the first transport stream signal and outputting a first delay transport stream signal; and a second delay generator for delaying the second transport stream signal and outputting a second delay transport stream signal.

The receiver includes a first AV decoder for decoding the first delay transport stream signal and outputting a first video signal and a first audio signal; and a second AV decoder for decoding the second delay transport stream signal and outputting a second video signal and a second audio signal. Furthermore, the receiver includes an video/audio switching unit for inputting of the first video signal and the first audio signal, and the second video signal and the second audio signal, selecting any of the first video signal and the first audio signal, and the second video signal and the second audio signal, and outputting a video signal and an audio signal based on the receiving quality information signal; a delay detector for inputting of the first audio signal and the second audio signal, detecting an audio delay amount between the first audio signal and the second audio signal, and outputting it as a delay amount signal; and a delay controller for receiving an input of the delay amount signal and controlling the first delay generator and the second delay generator.

The delay controller stepwise increases a delay amount of the first transport stream signal in the first delay generator or a delay amount of the second transport stream signal in the second delay generator so that output timing of the audio signal from the first AV decoder and output timing of the audio signal from the second AV decoder are the same as each other, thereby minimizing the audio delay amount.

With such a configuration, when the channel selection is carried out, firstly, a delay amount of the first transport stream signal and the second transport stream signal in the first delay generator and the second delay generator is set to be minimum. Then, the delay detector receives inputs of the first audio signal and the second audio signal output from the first AV decoder and the second AV decoder; detects the audio delay amount between the first audio signal and the second audio signal; and outputs it as the delay information signal to the delay controller. The delay controller receives an input of the delay information signal output from the delay detector, and can determine which delay generator of the first delay generator or the second delay generator and how much delay amount is to be added so as to synchronize the first video signal and first audio signal with the second video signal and second audio signal. Then, the delay controller stepwise increase the delay amount instead of merely setting the necessary delay amount to the first delay generator or the second delay generator.

For example, when delay of 381 data is added to the first delay generator, when the minimum value that can be set to the delay generator is assumed to be one datum, immediately after channel selection, the delay amount of the first delay generator and the second delay generator is set to be one datum. Thereafter, when a delay information signal is received from the delay detector, the delay amount set to the first delay generator is increased stepwise to 381 data. That is to say, the delay amount is increased by 20 data per second and the delay amount of 381 data is increased in 20 stages for 20 seconds.

Thus, the delay controller carries out the delay control so as to stepwise increase the delay amount in the first delay generator or the second delay generator so that the delay amount of the first delay generator and the second delay generator is minimum immediately after channel selection, and an error in the output timing of the audio signals from the first AV decoder and the second AV decoder is minimum. Thereby, a video signal and an audio signal are output without delay immediately after channel selection. Therefore, it is possible to provide a receiver capable of synchronizing the video signal output and the audio signal output between a plurality of receivable broadcast methods. Furthermore, since the delay controller stepwise increases the delay amount, the influence of the turbulence of image or sound on viewing/listening can be avoided.

Furthermore, the receiver of the present invention includes a demodulation unit for demodulating a channel-selected signal, outputting a first transport stream signal and a second transport stream signal, and determining a receiving quality and outputting it as a receiving quality information signal; a first delay generator for delaying the first transport stream signal and outputting a first delay transport stream signal; and a second delay generator for delaying the second transport stream signal and outputting a second delay transport stream signal.

The receiver includes a first AV decoder for decoding the first delay transport stream signal, outputting a first video signal and a first audio signal, and outputting either a first timing information signal or a first delay information signal; and a second AV decoder for decoding the second delay transport stream signal, outputting a second video signal and a second audio signal, and outputting either a second timing information signal or a second delay information signal. Furthermore, the receiver includes a video/audio switching unit for selecting any of the first video signal and the first audio signal, and the second video signal and the second audio signal, and outputting a video signal and an audio signal based on the receiving quality information signal; a delay detector for inputting of the first timing information signal and the second timing information signal or the first delay information signal and the second delay information signal, detecting a delay amount between the first audio signal and the second audio signal, and outputting it as a delay amount signal; and a delay controller for receiving an input of the delay amount signal and controlling the first delay generator and the second delay generator.

The delay controller may stepwise increase a delay amount of the first transport stream signal in the first delay generator or a delay amount of the second transport stream signal in the second delay generator so that output timing of the audio signal from the first AV decoder and output timing of the audio signal from the second AV decoder are the same as each other, thereby minimizing the audio delay amount.

With such a configuration, when channel selection is carried out, firstly, a delay amount of the first transport stream signal and the second transport stream signal in the first delay generator and the second delay generator is set to be minimum. Then, the delay detector receives inputs of timing information or delay information signal output from the first AV decoder and the second AV decoder; detects the audio delay amount between the first audio signal and the second audio signal; and outputs it to the delay controller as the delay information signal. The delay controller receives an input of the delay information signal output from the delay detector, and can determine which delay generator of the first delay generator or the second delay generator and how much delay amount is to be added in order to minimize an error between the timing signals output from the first AV decoder and the second AV decoder. Then, the delay controller stepwise increase the delay amount instead of merely setting the necessary delay amount to the first delay generator or the second delay generator. For example, when delay of 381 data is added to the first delay generator, when the minimum value that can be set to the delay generator is assumed to be one datum, immediately after channel selection, the delay amount of the first delay generator and the second delay generator is set to be one datum. Thereafter, when a delay information signal is received from the delay detector, the delay amount set to the first delay generator is increased stepwise to 381 data. That is to say, the delay amount is increased by 20 data per second and the delay amount of 381 data is increased in 20 stages for 20 seconds.

Thus, the delay controller carries out the delay control so as to stepwise increase the delay amount in the first delay generator or the second delay generator so that the delay amount of the first delay generator and the second delay generator is minimum immediately after channel selection, and an error in the timing of the audio signals from the first AV decoder and the second AV decoder is minimum. Thereby, a video signal and an audio signal are output without delay immediately after channel selection. Therefore, it is possible to provide a receiver capable of synchronizing the video signal output and the audio signal output between a plurality of receivable broadcast methods. Furthermore, since the delay controller stepwise increases the delay amount, the influence of the turbulence of image or sound on viewing/listening can be avoided.

Furthermore, the receiver of the present invention includes a demodulation unit for demodulating a channel-selected signal, outputting a first transport stream signal and a second transport stream signal, determining a receiving quality, and outputting it as a receiving quality information signal; a first delay generator for delaying the first transport stream signal and outputting a first delay transport stream signal; and a second delay generator for delaying the second transport stream signal and outputting a second delay transport stream signal.

The receiver includes a first AV decoder for decoding the first delay transport stream signal and outputting a first video signal and a first audio signal; and a second AV decoder for decoding the second delay transport stream signal and outputting a second video signal and a second audio signal. Furthermore, the receiver includes an video/audio switching unit for selecting either the first video signal and the first audio signal or the second video signal and the second audio signal, and outputting a video signal and an audio signal based on the receiving quality information signal; a delay detector for inputting of the first audio signal and the second audio signal, detecting an audio delay amount between the first audio signal and the second audio signal, and outputting it as a delay amount signal; and a delay controller for receiving an input of the delay amount signal and controlling the first delay generator and the second delay generator.

The delay controller increases or decreases a delay amount of the first transport stream signal or the second transport stream signal at a side that is not related to the video signal and the audio signal selected by the video/audio switching unit so that output timing of the audio signal from the first AV decoder and output timing of the audio signal from the second AV decoder are the same as each other, thereby minimizing the audio delay amount.

With such a configuration, when channel selection is carried out, firstly, the delay detector receives inputs of the first audio signal and the second audio signal output from the first AV decoder and the second AV decoder, and detects the audio delay amount between the first audio signal and the second audio signal. Then, the delay detector outputs the detected audio delay amount as a delay information signal to the delay controller. The delay controller receives an input of the delay information signal output from the delay detector and can determine which delay generator of the first delay generator or the second delay generator and how much delay amount is to be increased or decreased so as to synchronize the first video signal and first audio signal with the second video signal and second audio signal. Then, the delay controller sets a necessary delay amount to the first delay generator or the second delay generator.

Thus, the video signal and the audio signal can be output without delay immediately after channel selection. Therefore, it is possible to provide a receiver capable of synchronizing the video signal output and the audio signal output between a plurality of receivable broadcast methods. Furthermore, the delay controller increases or decrease the delay amount of the first transport stream signal or the second transport stream signal at a side that is not related to the video signal and the audio signal selected by the audio/video switching device or the delay amount of the second transport stream signal. Therefore, the influence of the turbulence of image or sound on viewing/listening can be avoided.

BRIEF DESCRIPTION OF THE DRAWINGS

FIG. 7 is a schematic view showing the change over time of a delay amount of the first delay generator or a delay amount of the second delay generator in accordance with the first exemplary embodiment of the present invention.

FIG. 9 shows a waveform showing a correlation of two delayed audio signals in accordance with the first exemplary embodiment of the present invention.

Figure 1:
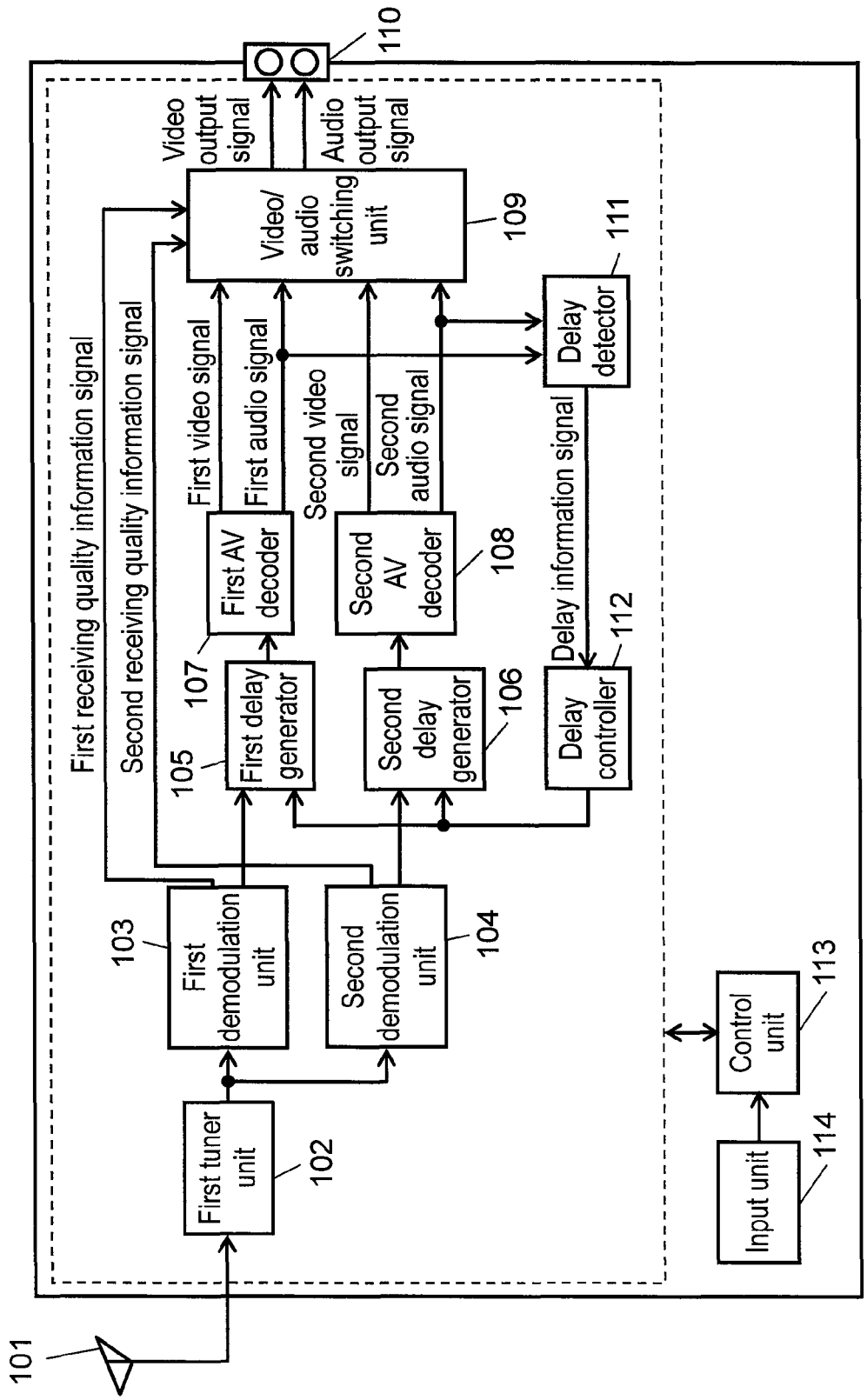
FIG. 1 is a block diagram showing a configuration of a receiver in accordance with a first exemplary embodiment of the present invention.

REFERENCE MARKS IN THE DRAWINGS 101 first antenna
102 first tuner unit
103 first demodulation unit
104 second demodulation unit
105 first delay generator
106 second delay generator
107 first AV decoder
108 second AV decoder
109 video/audio switching unit
110 video/audio output terminal
111 delay detector
112 delay controller
113 control unit
114 input unit
150 demodulation unit
152 second antenna
154 second tuner unit
201 FIFO memory
501 delay amount
502 delay amount
601 waveform 602 waveform
603 waveform
604 waveform
801 first antenna
802 first tuner unit
803 first demodulation unit
804 second demodulation unit
805 first delay generator
806 second delay generator
807 first AV decoder
808 second AV decoder
809 video/audio switching unit
810 video/audio output terminal
811 delay detector
812 delay controller
813 control unit
814 input unit
901 FIFO memory
1101 first antenna
1102 first tuner unit
1103 first demodulation unit
1104 second demodulation unit
1105 first delay generator
1106 second delay generator
1107 first AV decoder
1108 second AV decoder
1109 video/audio switching unit
1110 video/audio output terminal
1111 delay detector
1112 delay controller
1113 control unit
1114 input unit
1150 demodulation unit
1152 second antenna
1154 second tuner unit
1201 first antenna
1202 first tuner unit
1203 first demodulation unit
1204 second demodulation unit
1205 first delay generator
1206 second delay generator
1207 first AV decoder
1208 second AV decoder
1209 video/audio switching unit
1210 video/audio output terminal
1211 delay detector
1212 delay controller
1213 control unit
1214 input unit
1250 demodulation unit
1252 second antenna
1254 second tuner unit

DETAILED DESCRIPTION OF THE PREFERRED EMBODIMENTS

Hereinafter, exemplary embodiments of the present invention are described with reference to drawings.

First Exemplary Embodiment

FIG. 1 is a block diagram showing a configuration of a receiver in accordance with a first exemplary embodiment of the present invention. As shown in FIG. 1, a receiver includes first antenna 101, first tuner unit 102, first demodulation unit 103, second demodulation unit 104, first delay generator 105, second delay generator 106, first AV decoder 107, second AV decoder 108, video/audio switching unit 109, video/audio output terminal 110, delay detector 111, delay controller 112, control unit 113, and input unit 114.

Next, an operation of the thus configured receiver in accordance with this exemplary embodiment is described. First tuner unit 102 channel-selects a received signal input from first antenna 101 and outputs the channel-selected signal to first demodulation unit 103 and second demodulation unit 104. First demodulation unit 103 demodulates the channel-selected signal output from first tuner unit 102 and outputs a first transport stream signal to first delay generator 105. Furthermore, first demodulation unit 103 outputs a first receiving quality information signal calculated during demodulation to video/audio switching unit 109. Second demodulation unit 104 demodulates the channel-selected signal output from first tuner unit 102 and outputs a second transport stream signal to second delay generator 106. Furthermore, second demodulation unit 104 outputs a second receiving quality information signal calculated during demodulation to video/audio switching unit 109.

First delay generator 105 temporarily stores data of the first transport stream signal demodulated by first demodulation unit 103 so as to generate transmission delay of data. Then, first delay generator 105 outputs a first delay transport stream signal, in which transmission of data is delayed, to first AV decoder 107. Furthermore, second delay generator 106 temporarily stores data of the second transport stream signal demodulated by second demodulation unit 104 so as to generate transmission delay of data. Then, second delay generator 106 outputs a second delay transport stream signal, in which transmission of data is delayed, to second AV decoder 108.

First AV decoder 107 decodes the first delay transport stream signal output from first delay generator 105, and outputs the decoded first video signal and first audio signal to video/audio switching unit 109. Also, first AV decoder 107 outputs the first audio signal to delay detector 111. Then, second AV decoder 108 decodes the second delay transport stream signal output from second delay generator 106, and outputs the decoded second video signal and second audio signal to video/audio switching unit 109. Also, second AV decoder 108 outputs the second audio signal to delay detector 111.

Video/audio switching unit 109 receives inputs of the first video signal and the first audio signal output from first AV decoder 107 and the second video signal and the second audio signal output from second AV decoder 108 and selects either the first video signal and the first audio signal or the second video signal and the second audio signal, and outputs the selected signal to video/audio output terminal 110. Then, a video signal and an audio signal are output from video/audio output terminal 110 to the outside of the receiver based on the first receiving quality information signal and the second receiving quality information signal.

Delay detector 111 receives inputs of the first audio signal output from first AV decoder 107 and the second audio signal output from second AV decoder 108, and detects an audio delay amount that is a delay amount between the first audio signal and the second audio signal. Then, delay detector 111 outputs the detected an audio delay amount to delay controller 112 as a delay information signal.

Delay controller 112 receives an input of a delayed information signal output from delay detector 111 and controls first delay generator 105 and second delay generator 106. That is to say, delay controller 112 controls a delay amount of data of the first transport stream signal in first delay generator

105, and controls a delay amount of data of the second transport stream signal in second delay generator 106.

Control unit 113 controls and monitors the entire receiver. Specifically, control unit 113 controls and monitors first tuner unit 102, first demodulation unit 103, second demodulation unit 104, first delay generator 105, second delay generator 106, first AV decoder 107, second AV decoder 108, video/audio switching unit 109, video/audio output terminal 110, delay detector 111, and delay controller 112.

Input unit 114 is a button, an infrared receiver, or the like used by a user when the user operates the receiver. The user's operation detected in the input unit is transmitted to control unit 113.

In this exemplary embodiment, first demodulation unit 103 and second demodulation unit 104 demodulate signals of the different modulation methods output from the same tuner unit, respectively. For example, in the terrestrial digital broadcast, by using a method called hierarchical transmission, a plurality of signals of the different modulation methods can be multiplexed in the same physical channel and sent. Specifically, broadcast of sending 64 QAM and QPSK modulated signals in the same channel is carried out. The hierarchical transmission permits receiving corresponding to the receiving state. For example, in the 64 QAM hierarchy having a high transmission efficiency but low error resistance, high-definition broadcast for fixed receiving, in which a bit rate is high, is sent. Furthermore, in the QPSK hierarchy having a low transmission efficiency but high error resistance, the broadcast by a simplified video image for mobile receiving, in which a bit rate is low, is sent. Therefore, in this exemplary embodiment, as shown in FIG. 1, two demodulation units, that is, first demodulation unit 103 and second demodulation unit 104 are provided. However, the present invention can be also applied to a configuration in which a plurality of hierarchies can be demodulated by a demodulation unit composed of one block.

Figure 2:
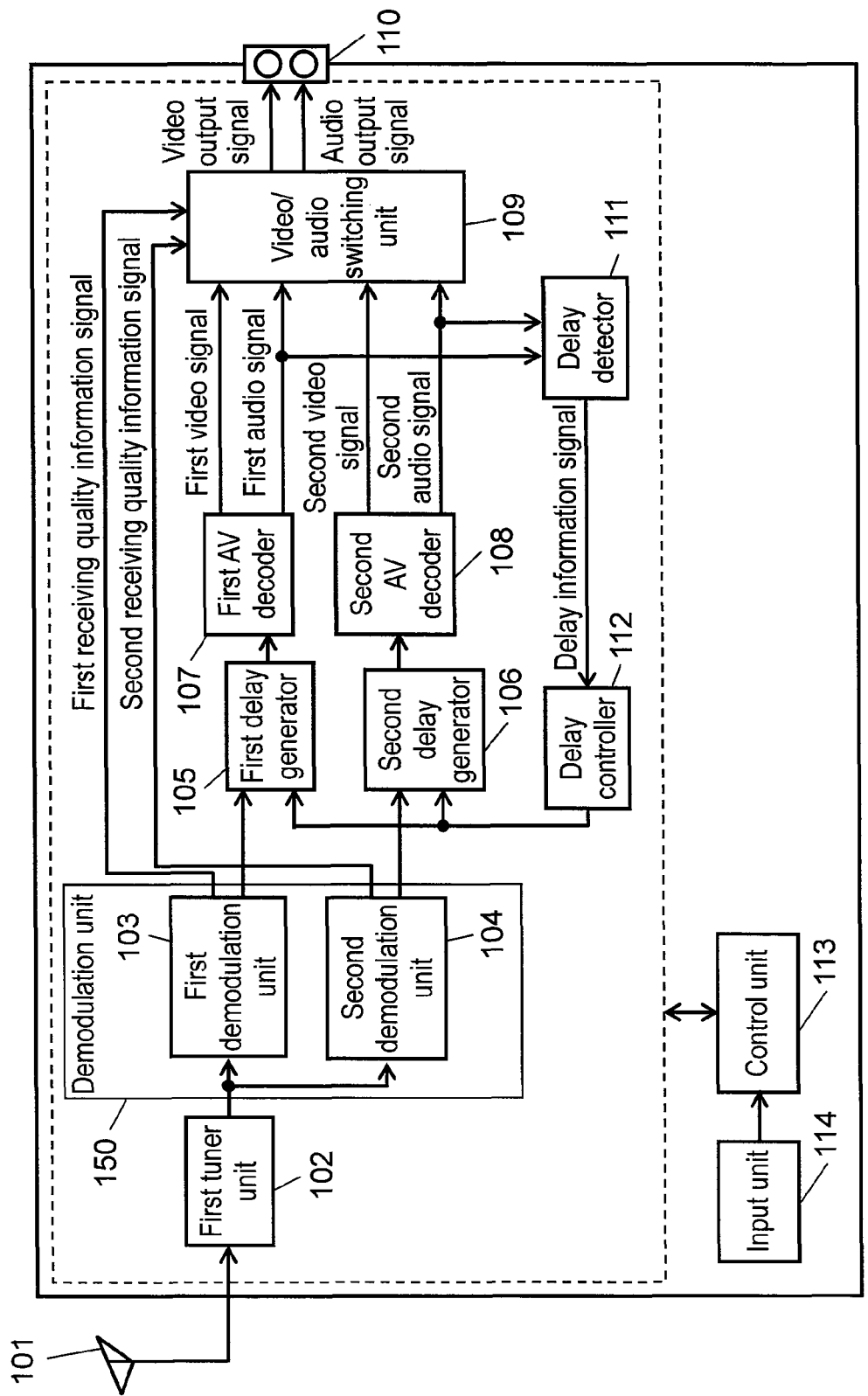
FIG. 2 is a block diagram showing another configuration of the receiver.

FIG. 2 is a block diagram showing another configuration of the receiver in this exemplary embodiment. Hereinafter, configurations that are different from those shown in FIG. 1 are described. As shown in FIG. 2, the receiver includes at least first antenna 101, first tuner unit 102, and demodulation unit 150 including first demodulation unit 103 and second demodulation unit 104.

In such a configuration, for example, first demodulation unit 103 demodulates a signal in the 64 QAM hierarchy having a high transmission efficiency but low error resistance, and second demodulation unit 104 demodulates a signal in the QPSK hierarchy having a low transmission efficiency but high error resistance. Then, demodulation unit 150 can be designed as one LSI. Therefore, first demodulation unit 103 can output a first transport stream in the high-definition broadcast in which the bit rate for fixed receiving and input it to first delay generator 105. Furthermore, second demodulation unit 104 can output a second transport stream in the broadcast by a simplified video image for mobile receiving in which the bit rate is low, and input it to second delay generator 106. That is to say, demodulation unit 150 including first demodulation unit 103 and second demodulation unit 104 demodulates the channel-selected signal and outputs the first transport stream signal and the second transport stream signal. Then, demodulation unit 150 determines a receiving quality and outputs the first receiving quality information signal and the second receiving quality information signal as a receiving quality information signal. In this way, even when signals of a plurality of the different modulation methods are multiplexed and transmitted in the same physical channel, the receivers of this exemplary embodiment can function similar to the receiver shown in FIG. 1. That is to say, the receiver in this exemplary embodiment includes a first tuner unit as a tuner unit for channel-selecting the received broadcast wave and outputting it as a channel-selected signal.

Furthermore, this exemplary embodiment describes the case in which signals modulated by two different modulation methods are multiplexed in the same physical channel. However, the present invention can be applied to a case by providing an additional tuner unit where signals are transmitted by the different channels or a case where signals are arriving via different transmission paths.

Figure 3:
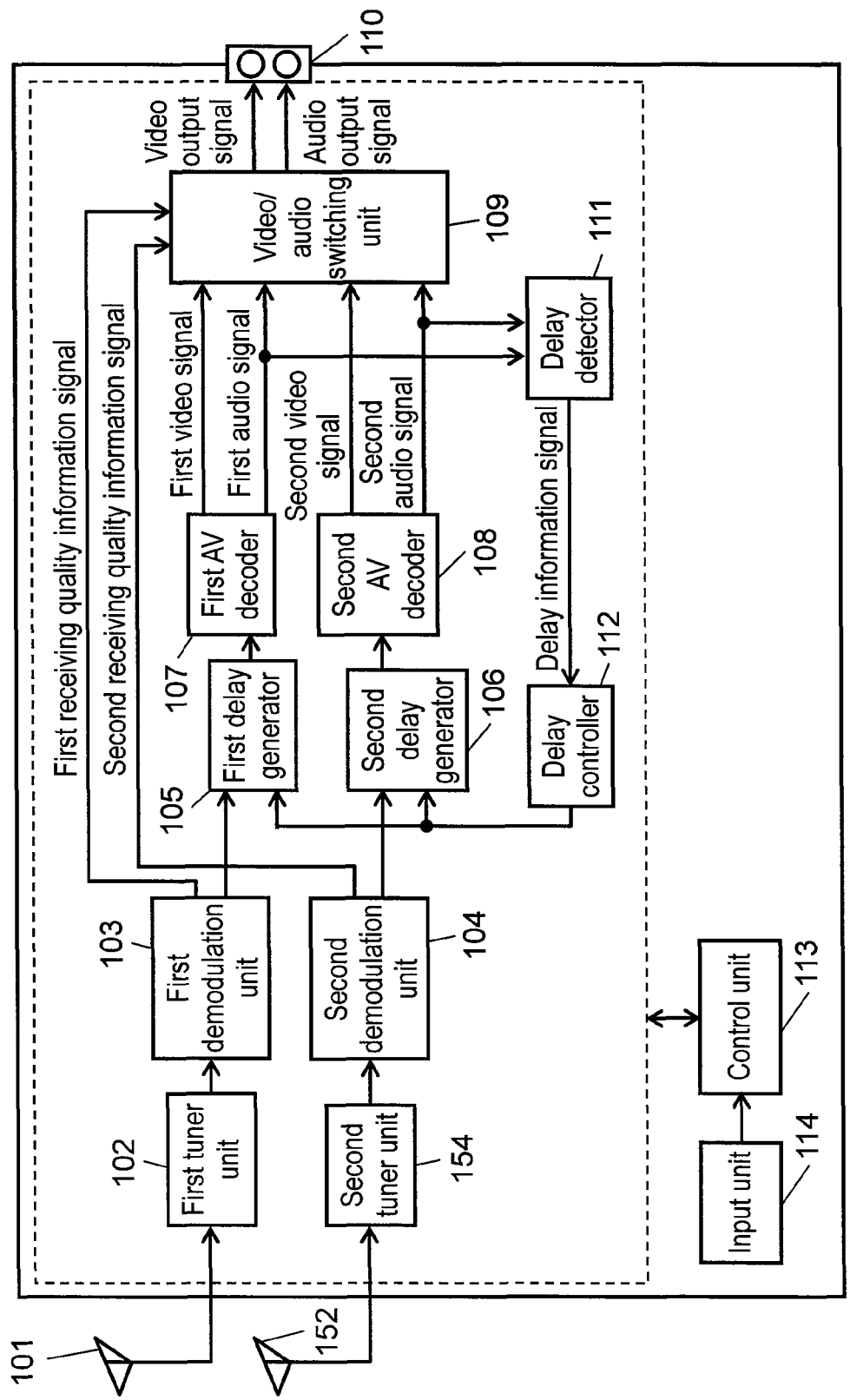
FIG. 3 is a block diagram showing a further configuration of the receiver.

FIG. 3 is a block diagram showing a further configuration of the receiver of this exemplary embodiment. Hereinafter, configurations that are different from those shown in FIG. 1 are described. As shown in FIG. 3, the receiver includes at least first antenna 101 for receiving a radio wave, and first tuner unit 102 for channel-selecting radio wave received by first antenna 101 and outputting it as the first channel-selected signal to first demodulation unit 103. Furthermore, the receiver includes at least second antenna 152 for receiving a radio wave, and first tuner unit 154 for channel-selecting radio wave received by second antenna 152 and outputting it as the second selected signal to second demodulation unit 104.

In such a configuration, for example, first antenna 101 and second antenna 152 can receive different channels of terrestrial digital broadcast. Furthermore, first antenna 101 may receive the terrestrial digital broadcast and second antenna 152 may receive BS digital broadcast. Then, received signals output from first antenna 101 and second antenna 152 are input into first tuner unit 102 and second tuner unit 154 and channel selection is carried out. Furthermore, the respective channel-selected signals are input into first demodulation unit 103 and second demodulation unit 104. Thus, the present invention can be applied to a case where signals that have been modulated by different modulation methods are transmitted by the different channels or a case where signals are arriving via different transmission paths because it can function in the same manner as the receiver shown in FIG. 1.

Note here that in the receiver having a configuration shown in FIG. 3, signals received by first antenna 101 and second antenna 152 are not particularly limited to a modulation signal by a broadcast wave such as the terrestrial digital broadcast. For example, they may be modulation signals including video signals and audio signals by communication systems such as Wi-Fi (Wireless Fidelity) or potable wireless communication system or wireless LAN, and the like. That is to say, in the receiver of the present invention, at least either of a radio wave received by first antenna 101 or second antenna 152 is digital broadcast and may be a radio wave by a modulation signal including a video signal and an audio signal, and the like. Furthermore, in the configuration in which second antenna 152 is removed and a wired LAN can be connected, the receiver of the present invention can also be applied to a case where when retransmission of the broadcast wave by a modulation signal including a video signal and an audio signal by using the wired LAN, and the like, is received.

Furthermore, since the maximum bit rate for sending is different depending upon the hierarchy, different image compression methods may be used. For example, in the hierarchy such as 64 QAM in which transmission is possible at a relatively high bit rate, MPEG2 compression is used. In the hierarchy such as QPSK in which transmission is possible only at a relatively low bit rate, for example, H.264 compression is used. Therefore, for decoding video images of the different image compression methods, this exemplary embodiment includes two AV decoders, that is, first AV decoder 107 and second AV decoder 108. However, the present invention can be applied to a configuration in which video images of a plurality of image compression methods can be decoded simultaneously by one block.

Figure 4:
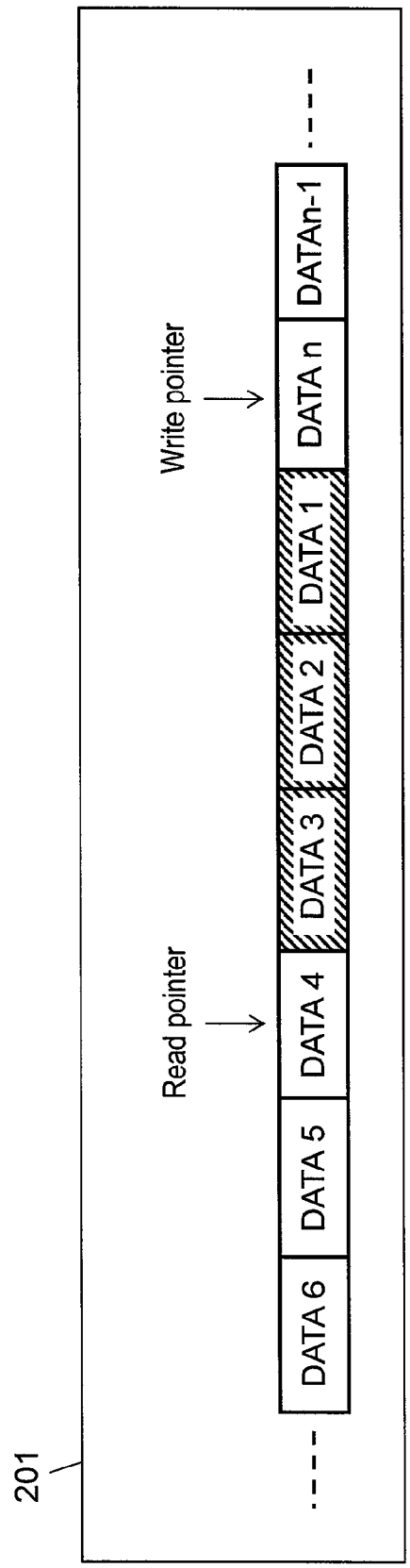
FIG. 4 is a schematic view showing a configuration of a delay generator in accordance with a first exemplary embodiment of the present invention.

Next, with reference to FIG. 4, configurations of first delay generator 105 and second delay generator 106 are described. As shown in FIG. 4, in this exemplary embodiment, first delay generator 105 and second delay generator 106 include FIFO memory 201. FIFO memory 201 can store n pieces of data. Herein, for example, one data are data of 204 bytes or 188 bytes of transport stream signals. However, the other number of bytes and the other data format may be employed.

As shown in FIG. 4, a write pointer of FIFO memory 201 shows DATAn as a memory position in which data are written in response to the following writing request to FIFO memory 201. Furthermore, the read pointer shows DATA4 as a memory position from which data are read out in response to the following reading request to FIFO memory 201. As shown in FIG. 4, the shaded areas from DATA1 to DATA3 show that data can be written over because data have been already read out. This exemplary embodiment includes two delay generators, that is, first delay generator 105 and second delay generator 106. However, one delay generator may be shared because data that need to be delayed are either data of video signals or data of audio signals.

Next, operations of the thus configured first delay generator 105 and second delay generator 106 are described. Firstly, the case where data are written in FIFO memory 201 is described. Data of transport stream signals output from first demodulation unit 103 and second demodulation unit 104 are stored in the memory position shown by the write pointer of FIFO memory 201. Then, when data are stored, the write pointer moves to the following empty memory position. In FIG. 4, the write pointer moves from a position of DATAn to a position of DATA1. Every time the writing request is made, the write pointer moves to a memory position at left side in FIG. 4. Then, when the following writing request is made in a state in which the write pointer reaches the left most position in FIFO memory 201 of FIG. 4, the write pointer moves to the right most position.

Next, a case where data are read out from FIFO memory 201 is described. When data are output from first delay generator 105 or second delay generator 106, data are read out from the memory position shown by the read pointer. Then, when data are read out, the read pointer moves to the following memory position. In FIG. 4, after DATA4 is output, the read pointer moves to the position of DATA5. In this way, the read pointer moves to the memory position at left side in FIG. 4 every time data are output. Then, when data are output in a state in which the read pointer reaches the left most position in FIFO memory 201 of FIG. 4, the read pointer moves to the right most position. In data stored in FIFO memory 201, the timing at which data are output is controlled by the control of delay controller 112.

Figure 5:
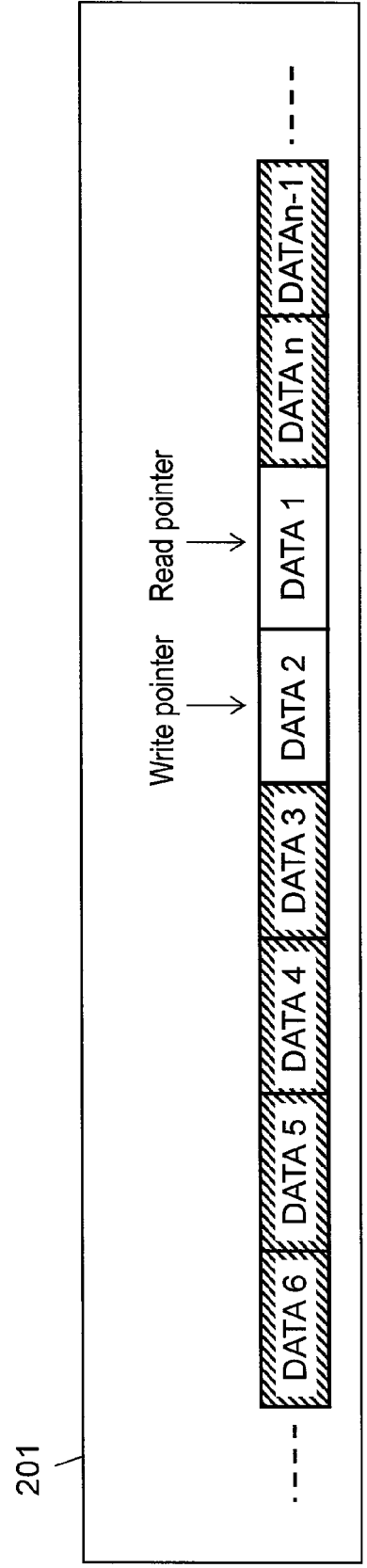
FIG. 5 is a schematic view showing a position relation between a read pointer and a write pointer when a delay amount of data of the transport stream signal in the delay generator is minimum in accordance with the first exemplary embodiment of the present invention.

FIG. 5 shows a position relation between a read pointer and a write pointer when a delay amount of data of the transport stream signal is minimum. Data output from first demodulation unit 103 and second demodulation unit 104 are written in the memory position shown by the write pointer but read out and output when the following data are output. In this case, since the difference between the memory position shown by the read pointer and the memory position shown by the write pointer is one memory, the delay amount is defined as one data.

Figure 6:
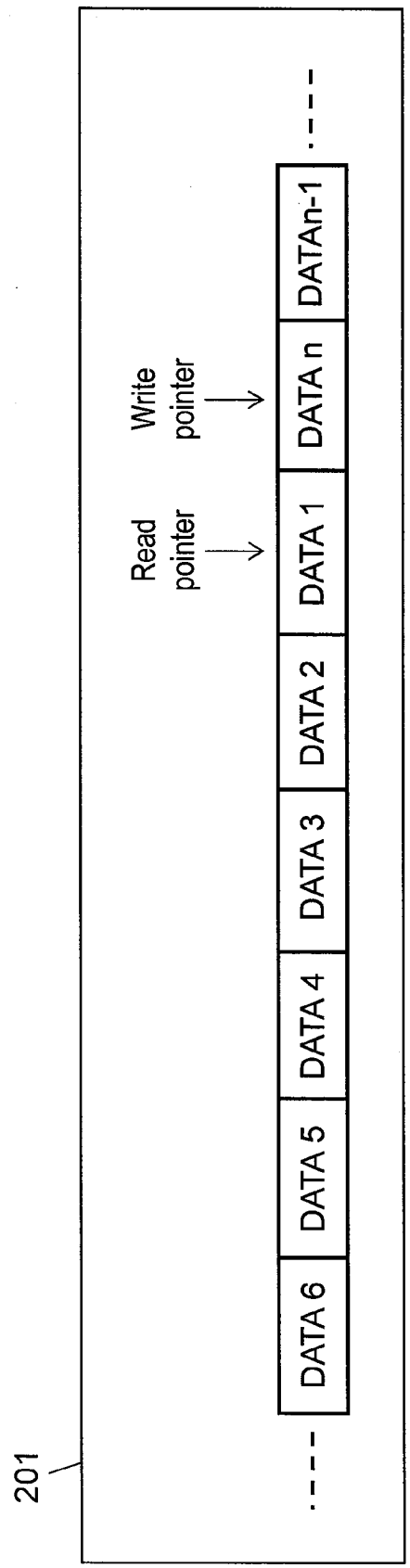
FIG. 6 is a schematic view showing a position relation between a read pointer and a write pointer when a delay amount of data of the transport stream signal in the delay generator is maximum in accordance with the first exemplary embodiment of the present invention.

On the other hand, FIG. 6 shows a position relation between a read pointer and a write pointer when the delay amount of data of the transport stream signal is maximum. In this case, since the difference between the memory position shown by the read pointer and the memory position shown by the write pointer is (n−1) memories, the delay amount of data is defined as (n−1) data.

Next, with reference to FIG. 7, a method of controlling first delay generator 105 and second delay generator 106 by delay controller 112 in this exemplary embodiment is described. FIG. 7 is a schematic view showing the change over time of delay amount 501 of first delay generator 105 and delay amount 502 of second delay generator 106 in the first exemplary embodiment of the present invention. First delay generator 105 and second delay generator 106 of this exemplary embodiment can change the delay amount up to 20 data at maximum for one second. Furthermore, in this exemplary embodiment, the first video signal and the first audio signal output from first AV decoder 107 are delayed by 380 data as compared with the second video signal and the second audio signal output from second AV decoder 108. In this case, when the delay amount of first delay generator 105 is defined as one data, that is, a minimum delay amount, the delay amount by second delay generator 106 needs to be increased stepwise from one data to 381 data.

Furthermore, the time displayed in FIG. 7 shows a passage time after channel selection is carried out by a user. Firstly, since delay is not added to first delay generator 105, the delay amount in first delay generator 105 is always minimum value, one data. Furthermore, the delay amount of second delay generator 106 when channel selection is carried out by a user is one data, which is the same as that of first delay generator 105. Therefore, the delay amount should be 381 data after a predetermined time has passed. In order to do so, delay controller 112 controls the delay amount in second delay generator 106 to minimum one data after one second, that is, immediately after channel selection. Thereafter, delay controller 112 increases the delay amount in second delay generator 106 by 20 data every one second. As a result, delay controller 112 controls the delay amount so that it finally becomes 381 data after a predetermined time, i.e., 20 seconds, has passed. Then, the delay amount is fixed at the point when it becomes 381 data.

Thus, the data are delayed stepwise. Therefore, in the receiver in this exemplary embodiment, immediately after channel selection, the delay amount of the first transport stream signal in first delay generator 105 and the delay amount of the second transport stream signal in second delay generator 106 are made to be minimum. Then, in accordance with viewing/listening, the delay amount is increased stepwise to the necessary delay amount. Furthermore, delay controller 112 can stepwise increase the delay amount, so that it can minimize the influence of the turbulence of image or sound on viewing/listening. Note here that in this exemplary embodiment, the change amount of 20 data per second are permitted and the delay amount is linearly increased over time. However, data may be changed non-linearly by using the other parameters. Also in this case, the same effect can be obtained.

For example, delay controller 112 adds two seconds of delay to second delay generator 106. In this case, when the minimum value that can be set to the delay generator is zero second, immediately after channel selection, the delay amount of first delay generator 105 and second delay generator 106 is set to zero second. Thereafter, when delay controller 112 receives a delay information signal from delay detector 111, delay controller 112 stepwise increases the delay amount set in first delay generator 105 up to second seconds. That is to say, delay controller 112 may control the delay amount so as to increase the delay amount of two seconds in 20 stages over 20 seconds by increasing the delay amount by 0.1 seconds per second.

The configuration in which delay controller 112 stepwise increases the delay amount is described. However, by carrying out the delay control more finely, the delay amount may be changed in simulated non-stage. Thus, the delay amount can be set more precisely. Therefore, the delay amount can be set smaller than a delay error between transport streams.

In this exemplary embodiment, at the time when the delay amount of the second delay generator becomes 381 data, the delay amount completely matches with the necessary delay amount. However, the delay amount is not always completely match with the necessary delay amount. In such a case, in the final stage of the delay control, a delay amount may be set to be smaller than the change amount of the delay amount. This can complete the delay control more rapidly and in turn can reduce a delay error between transport streams.

Furthermore, for example, delay controller 112 may control the delay amount as follows. That is to say, delay controller 112 stepwise increases a delay amount of first delay generator 105 or second delay generator 106 so as to exceed the necessary delay amount. Thereafter, delay controller 112 sets the change amount of the delay amount to be small and controls to reduce the delay amount. By repeating such a control, when the delay amount becomes a predetermined delay amount or less, delay controller 112 stops controlling the delay amount.

In this way, delay controller 112 can stepwise increase the delay amount of the first transport stream signal in first delay generator 105 or the second transport stream signal in second delay generator 106 so that the output timings of the audio signals from first AV decoder 107 and second AV decoder 108 are the same as each other and thereby can minimize the audio delay amount. Furthermore, as mentioned above, when the delay amount becomes a predetermined delay amount or less, delay controller 112 stops controlling the delay amount. Thereby, the audio delay amount can be made to be a predetermined value or less. Herein, the predetermined value of the audio delay amount is, for example, 35 ms or less. The time may be a time that does not bring about a sense of discomfort in viewing/listening when the transport stream is switched.

In this exemplary embodiment, the case where first delay generator 105 and second delay generator 106 are FIFO memory 201 is described. However, it may be a medium such as HDD or disk media, which is capable of temporarily holding data.

Furthermore, in this exemplary embodiment, the case where a delay generator is a memory for storing data is described as an example. However, the delay generator may be one that re-rewrites time stamp described in data. For example, by rewriting the value of PTS (Presentation Time Stamp), it is possible to generate a delay in the AV decoder. If the necessary delay amount is 5000 as the PTS value, when the PTS of received data is 10000, the PTS data are rewritten into the value 15000 and output to an AV decoder. In this way, first delay generator 105 and second delay generator 106 may be configured so as to rewrite the time stamp described in the first transport stream signal and the second transport stream signal. With this configuration, the delay amount of the first transport stream signal in first delay generator 105 or the delay amount of the second transport stream signal in second delay generator 106 can be set so that the output timing of audio signals from first AV decoder 107 and second AV decoder 108 are the same as each other. Note here that when the PTS is increased by rewriting from the value 10000 to the value 15000, delay controller 112 controls first delay generator 105 and second delay generator 106 so that the value of PTS is stepwise increased as mentioned above.

Figure 8A:
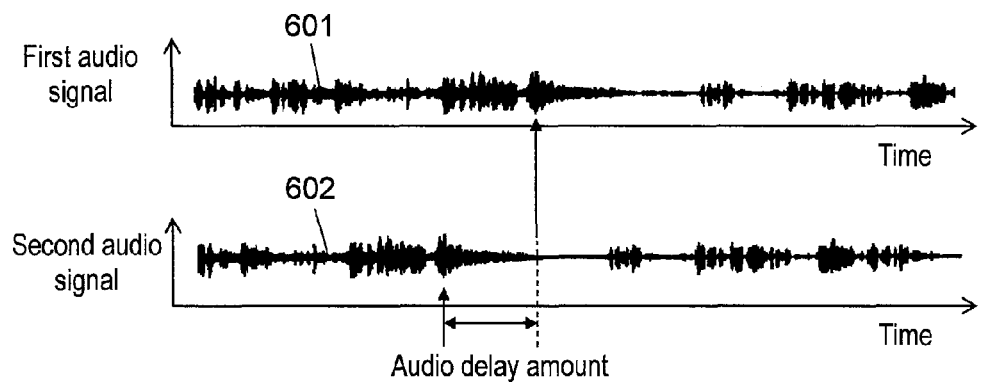
FIG. 8A is a schematic view showing waveforms output from an AV decoder in accordance with the first exemplary embodiment of the present invention.
Figure 8B:
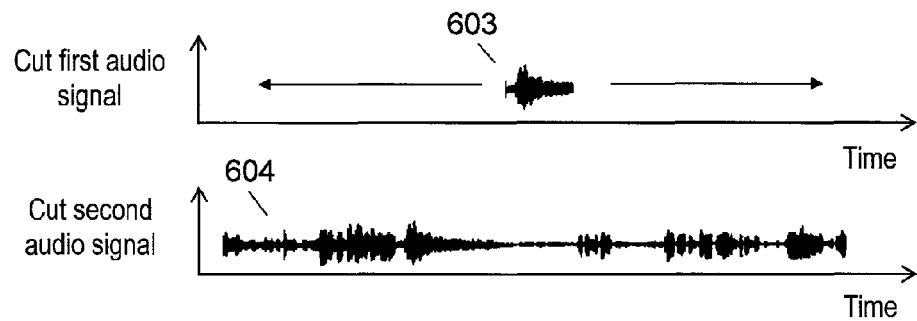
FIG. 8B is a schematic view showing a comparison method of the waveforms output from an AV decoder in accordance with the first exemplary embodiment of the present invention.

Next, with reference to FIGS. 8A and 8B, an operation of delay detector 111 is described. FIG. 8A is a schematic view showing waveforms output from an AV decoder in accordance with the first exemplary embodiment of the present invention. Furthermore, FIG. 8B is a schematic view showing a comparison method of the waveforms output from an AV decoder in accordance with the first exemplary embodiment of the present invention. In this exemplary embodiment, the delay detection is realized by comparing audio signals after they are decoded in two systems. Waveform 601 in FIG. 8A shows a first audio signal output from first AV decoder 107. Furthermore, waveform 602 shows a second audio signal output from second AV decoder 108. By comparing waveform 601 and waveform 602 with each other, it is shown that waveform 602 is delayed from waveform 601 by a certain time. In FIG. 8, this is shown as an audio delay amount.

Next, a method for comparing waveforms output from an AV decoder is described. Delay detector 111 cuts out the first audio signal and second audio signal from first AV decoder 107 and second AV decoder 108 in different sample lengths. Waveform 603 in FIG. 8B is a result of cutting out the first audio signal from first AV decoder 107, and waveform 604 is a result of cutting out the second audio signal from second AV decoder 108. While the waveforms cut out in the different sample lengths are displaced from each other, delay detector 111 can compare the first audio signal to the second audio signal with each other and detects the correlation therebetween. Thus, the audio delay amount can be detected.

FIG. 9 is a waveform showing the correlation of two delayed audio signals. In order to compare the first audio signal and the second audio signal to detect the correlation, actually, the distribution between data of the first audio signal and the second audio signal is calculated. In FIG. 9, the ordinate shows the distribution between data of audio signals and the abscissa shows a time. The waveform in this distribution includes only one portion where the value is largely changed. This portion is in about $0.65 \times 10^{-3}$ seconds. This value corresponds to the calculated audio delay amount.

Note here that the audio signals output from two AV decoders in this exemplary embodiment may be compressed by different compression methods or may be different in the sampling rate. Therefore, by correlating the adjusted average audio volumes of the audio waveform to be compared, more precise delay detection becomes possible. In order to adjust the average audio volume of the audio waveforms, for example, an audio level control unit for controlling the average audio volume and an audio level detector for detecting the audio volume may be provided in the front stage of delay detector 111. With such a configuration, the audio level detected by the audio level detector is compared with a predetermined level, an error signal is generated. Then, the error signal is input into the audio level control unit so as to control the audio volume. Thus, delay detector 111 may detect the audio delay amount after the average audio volumes of the first audio signal and the second audio signal are adjusted. As a result, delay detector 111 permits more precise delay detection.

Furthermore, since the band may be sometimes restricted by a specific compression method, the audio frequency band to be noted is extracted and then correlated, thereby making it more precise to detect delay detection. In order to extract the audio frequency band to be noted from the audio signal, for example, a low-pass filter or a band pass filter may be provided in the front stage of delay detector 111. Then, delay detector 111 compares the first audio signal with the second audio signal after it extracts the specific frequency band and then detects the audio delay amount. Since such a configuration permits the removal of noise with high frequency entering from the outside or noise with very low band, by only the signal of audio frequency band to be noted, the first audio signal and the second audio signal can be correlated. Therefore, delay detector 111 permits more precise delay detection.

In this exemplary embodiment, an audio delay amount is detected by correlating audio signals output from two AV decoders, however, delay detector 111 may compare the first audio signal and the second audio signal with each other when the first audio signal and the second audio signal pass through the zero-cross point. The zero-cross point of an audio signal is data having a minimum audio volume and it can be detected easily. Furthermore, since the audio delay amount can be calculated on the time axis on average, more precise delay detection becomes possible.

Furthermore, an audio delay amount is changed only when a transmitting channel is changed, for example, in accordance with the movement of the receiving place. Therefore, delay detector 111 may be detected in a predetermined cycle so as to detect the audio delay amount. For example, the predetermined period may be about 1 s (second). Thus, the delay detection is carried out periodically so as to correct the audio delay amount, thereby permitting more precise synchronization.

Furthermore, this delay detection may be deteriorated in terms of the delay detection precision in the comparison when any of the first audio signal and the second audio signal is in a silent period. Therefore, when delay detector 111 may stop detecting of the audio delay amount for a certain time when any of the first audio signal and the second audio signal is determined to be a silent for a certain time. Note here that for example, the certain time is made to be from about 500 ms to 1 s, and the predetermined period may be about 200 ms to 3 s. Furthermore, instead of stopping the detection of the audio delay amount for a predetermined period, the detection of the audio delay amount may be started again after it is stopped. For example, in the case of audio data having 1024 stages of audio level values, the detection of the audio delay amount may be started again when the audio level value is beyond 256. In this way, when delay detection is not carried out during the silent period of audio signal, more precise synchronization is possible.

Note here that since this delay detection is more precise when the change amount of the audio signal is larger, when the level change amount of the first audio signal and the second audio signal from first AV decoder 107 and second AV decoder 108 is a predetermined value or less, the delay detection is not carried out. That is to say, delay detector 111 detects an audio delay amount when the level change amount of the first audio signal or the second audio signal is beyond a predetermined value. For example, the predetermined value of the level change amount may be the case where the first audio signal and the second audio signal have a change amount of the level of $1/10$ or more of the maximum audio volume for about 0.5 seconds. As a result, more precise synchronization is possible.

Next, an operation of video/audio switching unit 109 in this exemplary embodiment is described in detail. As shown in FIG. 1, video/audio switching unit 109 receives inputs of a first receiving quality information signal and a second receiving quality information signal from first demodulation unit 103 and second demodulation unit 104, and switches the first video signal and first audio signal and the second video signal and second audio signal. The following description assumed that first demodulation unit 103 receives 64 QAM signal of weaker hierarchy and second demodulation unit 104 receives QPSK signal of stronger hierarchy.

When 64 QAM and QPSK signals are received simultaneously, when the receiving environment is bad, firstly, the receiving quality of 64 QAM approaches the receiving error generation limit. Herein, video/audio switching unit 109 selects and outputs the first video signal and first audio signal demodulated by first demodulation unit 103, delayed by first delay generator 105, and video/audio decoded by first AV decoder 107. In this case, when video/audio switching unit 109 detects that the first receiving quality information signal from first demodulation unit 103 that receives 64 QAM approaches the receiving error generation limit, it switches the signal from the first video signal and first audio signal to the second video signal and second audio signal and outputs the signals. The second video signal and second audio signal are demodulated by second demodulation unit 104, delayed in second delay generator 106, and video/audio decoded in second AV decoder 108.

Note here that video/audio switching unit 109 receives an input of the first receiving quality information signal and the second receiving quality information signal from first demodulation unit 103 and second demodulation unit 104. However, the same effect can be obtained by the second receiving quality information signal at the side of weak hierarchy. Furthermore, the first receiving quality information signal and the second receiving quality information signal as the receiving quality information signal may use any one of a packet error information signal, a packet absence information signal, a bit error information signal, and a CN ratio information signal, which can be generated when signals are demodulated by the first demodulation unit 103 and second demodulation unit 104. Even if any of these information signals are used, it is possible to detect that a receiving environment becomes worse and approaches the receiving error generation limit.

Furthermore, in this exemplary embodiment, the first receiving quality information signal and the second receiving quality information signal are directly input into video/audio switching unit 109. However, they may be once subjected to signal processing in control unit 113 and then, control unit 113 may issue a request for switching to video/audio switching unit 109.

Note here that video/audio switching unit 109 may carry out the switching between the first video signal and the second video signal at the different switching timing from that between the first audio signal and the second audio signal. Furthermore, they may be carried out at the same timing. When video/audio switching unit 109 carry out the switching at different timings, the switching timing of the video signal and the switching timing of the audio signal can be appropriately selected, respectively. For example, when video/audio switching unit 109 carries out the switching of video signal output from video/audio switching unit 109 at the point when scenes are changed, turbulence of the video image can be relatively unrecognizable. This is because the scenes are in tone of color, configurations and the like, of the image screen, may be largely changed in the point when scenes are changed, and therefore even if the turbulence occurs, it is relatively unrecognizable to viewers.

Furthermore, when video/audio switching unit 109 carries out the switching of video signals output from video/audio switching unit 109 during the blanking period of the video signal, it is possible to make turbulence of the video image be unrecognizable to a viewer. This is because the blanking period of the video signal is a signal control period of video signals, which cannot be actually seen by a viewer.

Furthermore, video/audio switching unit 109 carries out switching of audio signals output from video/audio switching unit 109 at a timing at which the audio signal passes through the zero-cross point, thereby enabling unpleasant noise to be suppressed. This is because the zero-cross point of the audio signal is an audio standard level and silent. Therefore, even if a noise occurs when the audio signal is switched, the level can be made to small amplitude. Furthermore, video/audio switching unit 109 may carry out switching of audio signals output from video/audio switching unit 109 during a silent period. Also in this way, for the same reason as that of the switching of the audio signal level that has passed the zero-cross point, an unpleasant noise can be suppressed.

Thus, audio delay amount detected by delay detector 111 is output to delay controller 112. Then, delay controller 112 stepwise controls first delay generator 105 and second delay generator 106 based on the detected delay amount. Furthermore, immediately after channel selection, delay controller 112 controls the delay amount in first delay generator 105 and second delay generator 106 to be minimum, that is, one data. Thereafter, delay controller 112 carries out delay control so that the delay amount in first delay generator 105 or second delay generator 106 is increased stepwise so that the delay amount of the first video signal and the first audio signal output from first AV decoder 107 and the second video signal and the second audio signal output from second AV decoder 108 becomes minimum. As a result, according to the receiver of the present invention, immediately after channel selection, the first video signal and the first audio signal or the second video signal and the second audio signal are output without delay. Therefore, it is possible to provide a receiver capable of synchronizing the video signal output and the audio signal output between a plurality of receivable broadcast methods.

Note here that as mentioned above, delay controller 112 carries out control so that the delay amount in first delay generator 105 and second delay generator 106 becomes minimum data, that is, one data immediately after channel selection. Thereafter, delay controller 112 controls the delay so that the delay amount in first delay generator 105 or second delay generator 106 is increased stepwise so that the delay amount of the first video signal and the first audio signal output from first AV decoder 107 and the second video signal and the second audio signal output from second AV decoder 108 becomes minimum. However, delay controller 112 may increase or reduce the delay amount of a first transport stream signal or a second transport stream signal at a side that is not related to the video signal and the audio signal selected by video/audio switching unit 109 so that the output timing of the audio signal from first AV decoder 107 and second AV decoder 108 are the same. As a result, the audio delay amount can be minimized.

With such a configuration, when a station selecting operation is carried out, firstly, delay detector 111 receives inputs of the first audio signal and the second audio signal output from first AV decoder 107 and second AV decoder 108, and detects the audio delay amount of the first audio signal and the second audio signal. Then, delay detector 111 outputs the detected audio delay amount as a delay information signal to delay controller 112. Delay controller 112 receives an input of a delay information signal output from delay detector 111 and determines which delay generator of first delay generator 105 or second delay generator 106 and how much that how much delay amount is to be increased or reduced in order to synchronize the first video signal and first audio signal with the second video signal and second audio signal. Then, delay controller 112 sets a necessary delay amount to first delay generator 105 or second delay generator 106.

When delay controller 112 sets a necessary delay amount to first delay generator 105 or second delay generator 106, the delay amount of first delay generator 105 or second delay generator 106 may become minimum or maximum. Furthermore, even if the delay amount becomes minimum or maximum, the amount of controlling the delay amount in order to equalize the output timing of the audio signal may be still deficient. In this case, delay controller 112, as a further control, may stepwise increase or reduce the delay amount a first transport stream signal or a second transport stream signal at a side that is related to the video signal and the audio signal selected by video/audio switching unit 109 so that the output timing of the audio signal from first AV decoder 107 and second AV decoder 108 are the same. Thus, an audio delay amount may be minimized.

Thus, immediately after channel selection, the video signal and the audio signal can be output without delay. Therefore, it is possible to provide a receiver capable of synchronizing the video signal output and the audio signal output between a plurality of receivable broadcast methods. Furthermore, since delay controller 112 increases or reduces the delay amount of a first transport stream signal or a second transport stream signal at the side that is not related to the video signal and the audio signal selected by video/audio switching unit 109, the influence of the turbulence of image or sound on viewing/listening can be avoided.

Furthermore, the control by delay controller 112 as mentioned above in this exemplary embodiment shown in FIG. 1 is not particularly limited to the configuration of FIG. 1. For example, it can be applied to the receivers having configurations shown in FIGS. 2 and 3.

Second Exemplary Embodiment

The first exemplary embodiment shows a configuration in which each delay generator delays coded signals of the video signal and the audio signal. However, a second exemplary embodiment shows a configuration that is different from the first exemplary embodiment in that AV decoded video signal and audio signal are delayed. Note here that detailed description of the same configurations and operations as those in the first exemplary embodiment are omitted.

Figure 10:
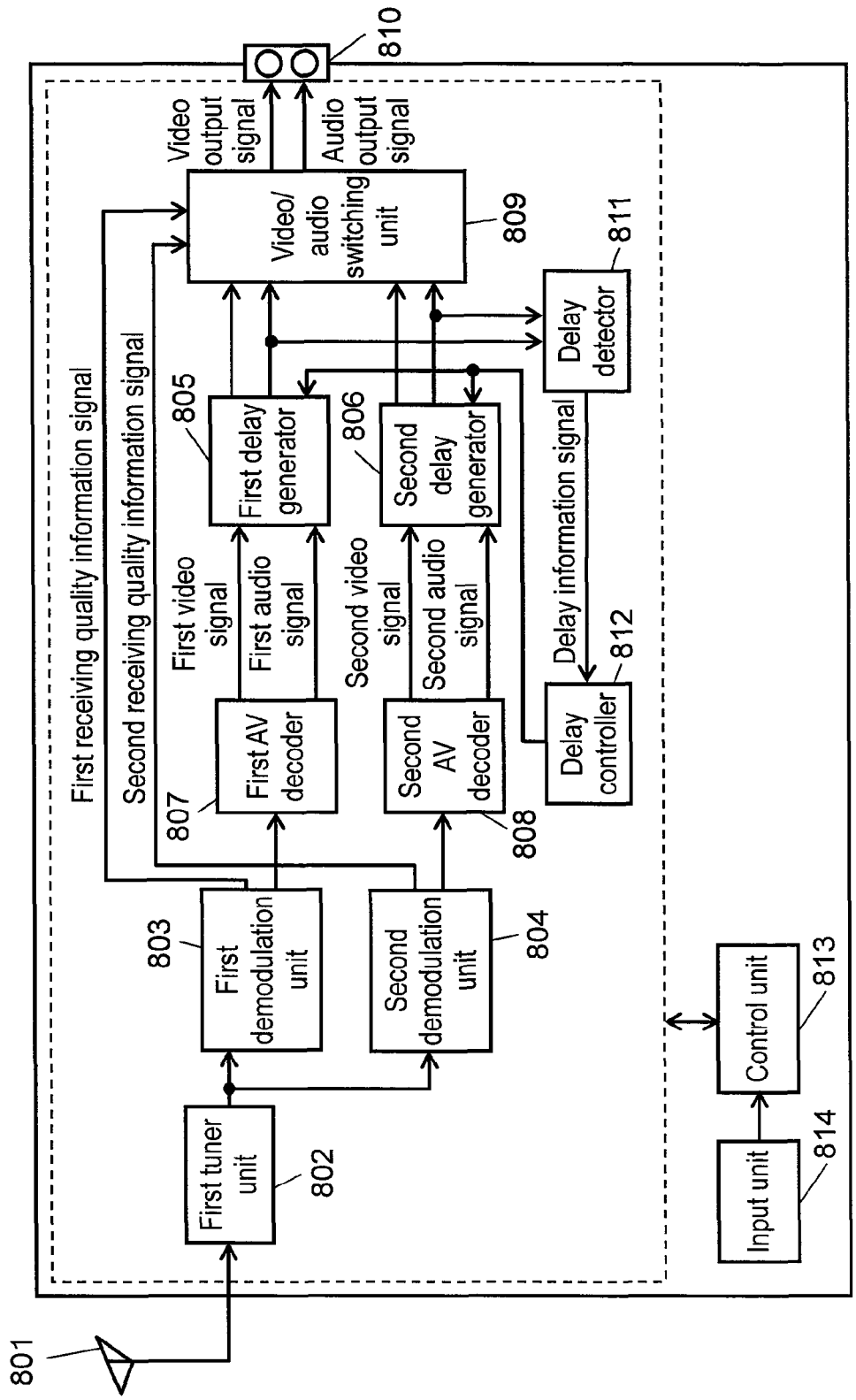
FIG. 10 is a block diagram showing a configuration of a receiver in accordance with a second exemplary embodiment of the present invention.

FIG. 10 is a block diagram showing a configuration of a receiver in accordance with the second exemplary embodiment, which includes first delay generator 805 and second delay generator 806 for AV decoding the received signal and then delaying a video signal and an audio signal.

As shown in FIG. 10, the receiver of this exemplary embodiment includes first antenna 801, first tuner unit 802, first demodulation unit 803, second demodulation unit 804, first delay generator 805, second delay generator 806, first AV decoder 807, second AV decoder 808, video/audio switching unit 809, video/audio output terminal 810, delay detector 811, delay controller 812, control unit 813 and input unit 814.

Next, an operation of the thus configured receiver is described. First tuner unit 802 channel-selects a received signal input from first antenna 801, and outputs the channel-selected signal into first demodulation unit 803 and second demodulation unit 804. First demodulation unit 803 demodulates the channel-selected signal output from first tuner unit 802, and outputs a first transport stream signal to first AV decoder 807. Furthermore, first demodulation unit 803 outputs a first receiving quality information signal calculated during demodulation to video/audio switching unit 809. Second demodulation unit 804 demodulates the channel-selected signal output from first tuner unit 802, and outputs a second transport stream signal to second AV decoder 808. Furthermore, second demodulation unit 804 outputs a second receiving quality information signal calculated during demodulation to video/audio switching unit 809.

First AV decoder 807 decodes data of the first transport stream signal output from first demodulation unit 803, and outputs the decoded first video signal and first audio signal to first delay generator 805. Furthermore, second AV decoder 808 decodes data of the second transport stream signal output from second demodulation unit 804, and outputs the decoded second video signal and second audio signal to second delay generator 806.

First delay generator 805 temporarily stores the first video signal and the first audio signal, which are decoded in first AV decoder 807, so as to generate transmission delay in the first video signal and the first audio signal and outputs them to video/audio switching unit 809. Furthermore, first delay generator 805 outputs the delayed first audio signal to delay detector 811. Furthermore, second delay generator 806 temporarily stores the second video signal and the second audio signal, which are decoded in second AV decoder 808, so as to generate transmission delay in the second video signal and second audio signal, and outputs them to video/audio switching unit 809. Furthermore, second delay generator 806 outputs the delayed second audio signal to delay detector 811.

Video/audio switching unit 809 receives an input of the delayed first video signal and first audio signal output from first delay generator 805 and the delayed second video signal and second audio signal output from second delay generator 806, selects whether the first video signal and first audio signal or the second video signal and second audio signal and outputs it to video/audio output terminal 810, based on the first receiving quality information signal and the second receiving quality information signal. Then, video/audio output terminal 810 outputs a video signal and an audio signal to the outside of the receiver.

Delay detector 811 receives inputs of delayed first audio signal and second audio signal output from first delay generator 805 and second delay generator 806, and detects the audio delay amount that is a delay amount between the first audio signal and the second audio signal. Then, a delay information signal is output to delay controller 812.

Delay controller 812 receives an input of a delay information signal output from delay detector 811, and controls first delay generator 805 and second delay generator 806. That is to say, delay controller 812 controls the delay amount of the first video signal and first audio signal in first delay generator 805 and the delay amount of the second video signal and second audio signal in second delay generator 806.

Control unit 813 controls and monitors the entire receiver. Specifically, control unit 813 controls and monitors first tuner unit 802, first demodulation unit 803, second demodulation unit 804, first delay generator 805, second delay generator 806, first AV decoder 807, second AV decoder 808, video/audio switching unit 809, video/audio output terminal 810, delay detector 811, and delay controller 812.

Input unit 814 is a button, an infrared receiver, or the like used by a user when the user operates the receiver. The user's operation detected in the input unit is transmitted to control unit 813.

Figure 11:
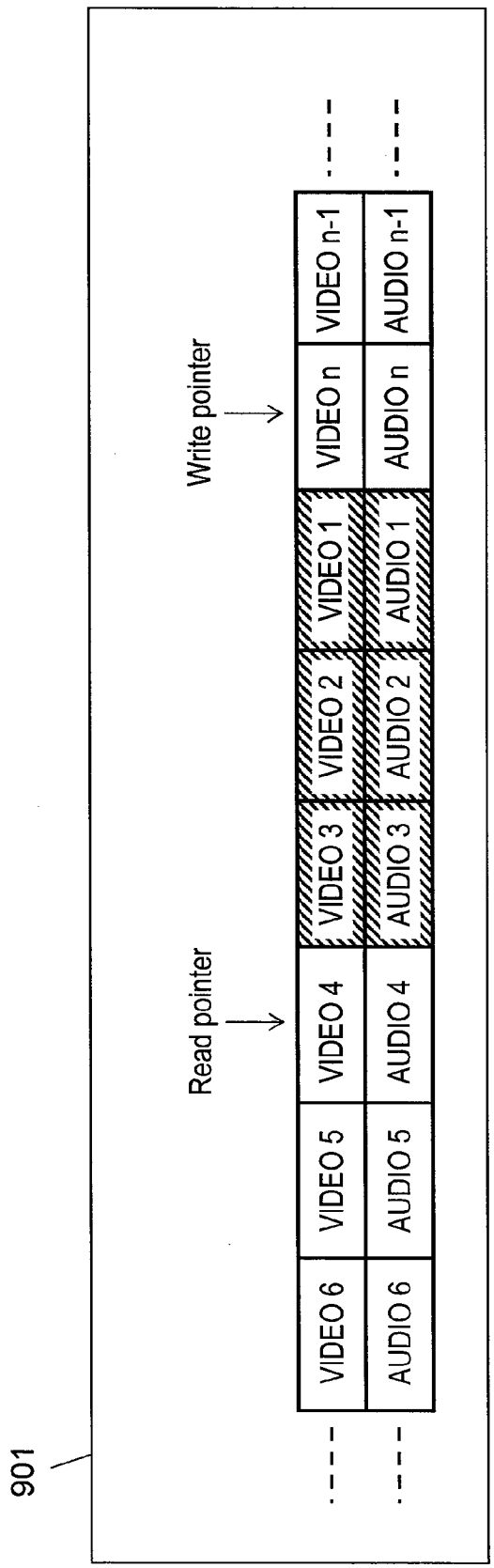
FIG. 11 is a schematic view showing a configuration of a delay generator in accordance with the second exemplary embodiment of the present invention.

Next, with reference to FIG. 11, the configurations of first delay generator 805 and second delay generator 806 are described. As shown in the drawing, first delay generator 805 and second delay generator 806 include FIFO memory 901. FIFO memory 901 is capable of storing n pieces of data of video signals and audio signals. As shown in FIG. 11, the write pointer shows VIDEOn and AUDIOn as memory positions in which data are written in response to the following writing request to FIFO memory 901. Furthermore, the read pointer shows VIDEO4 and AUDIO4 as memory positions from which data are read out in response to the following reading request to FIFO memory 901. As shown in FIG. 11, in the shaded areas from VIDEO1 to VIDEO3 and from AUDIO1 to AUDIO3, data can be written over because data have been already read out. This exemplary embodiment includes two delay generators, that is, first delay generator 805 and second delay generator 806. However, since data that need to be delayed are either data of video signals or data of audio signals, one delay generator may be shared.

Next, operations of the thus configured first delay generator 805 and second delay generator 806 are described. Firstly, the case where data are written in FIFO memory 901 is described. Data of the video signal and the audio signal output from first AV decoder 807 and second AV decoder 808 are stored in the memory position shown by the write pointer in FIFO memory 901. Then, when the data of the video signal and the audio signal are stored, the write pointer moves to the following empty memory position. In FIG. 11, the write pointer moves from VIDEOn to VIDEO1 and from AUDIOn to AUDIO1. Every time the writing request is made, the write pointer moves to the memory position at left side in FIG. 11. When the following writing request is made in a state in which the write pointer reaches the left most position in FIFO memory 901 of FIG. 11, the write pointer moves to the right most position.

Next, a case where data are read out from FIFO memory 901 is described. When data of the video signal and the audio signal are output from first delay generator 805 or second delay generator 806, the data of the video signal and the audio signal are read out from the memory position shown by the read pointer. Then, when the data are read out, the read pointer moves to the following data position. In FIG. 11, after VIDEO4 and AUDIO4 are output, the read pointer moves to the position of VIDEO5 and AUDIO5. In this way, the read pointer moves to the left side in FIG. 11 every time when the data of the video signal and the audio signal are output. Then, when the data are output in a state in which the read pointer reaches the left most position in FIFO memory 901 of FIG. 11, the read pointer moves to the right most position. The timing of outputting the data of the video signal and the audio signal of the data of the video signal and the audio signal stored in FIFO memory 901 is controlled based on the control from delay controller 812.

Figure 12:
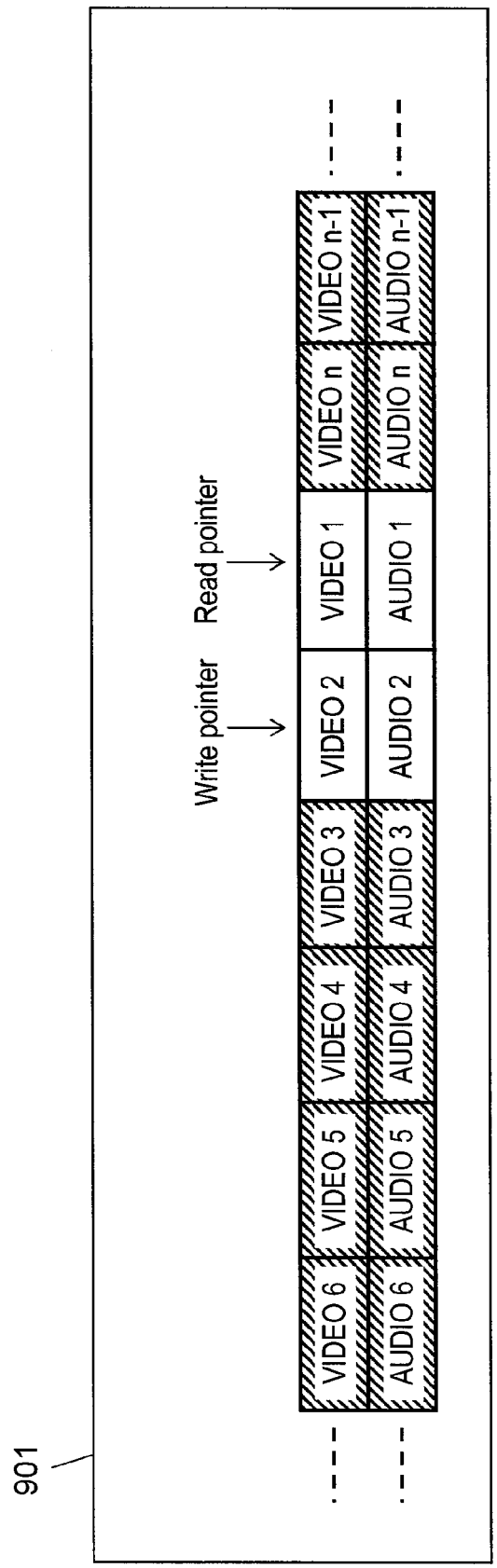
FIG. 12 is a schematic view showing a position relation between a read pointer and a write pointer when a delay amount of data of a video signal and an audio signal in the delay generator is minimum in accordance with the second exemplary embodiment of the present invention.

FIG. 12 shows the position relation between a read pointer and a write pointer when a delay amount of data of a video signal and an audio signal is minimum. The data of the video signal and audio signal output from first AV decoder 807 and second AV decoder 808 are written in the memory position shown by the write pointer and read out when the following data are output. In this case, since the difference between the memory position shown by the read pointer and the memory position shown by the write pointer is one memory, the delay amount is defined as one data.

Figure 13:
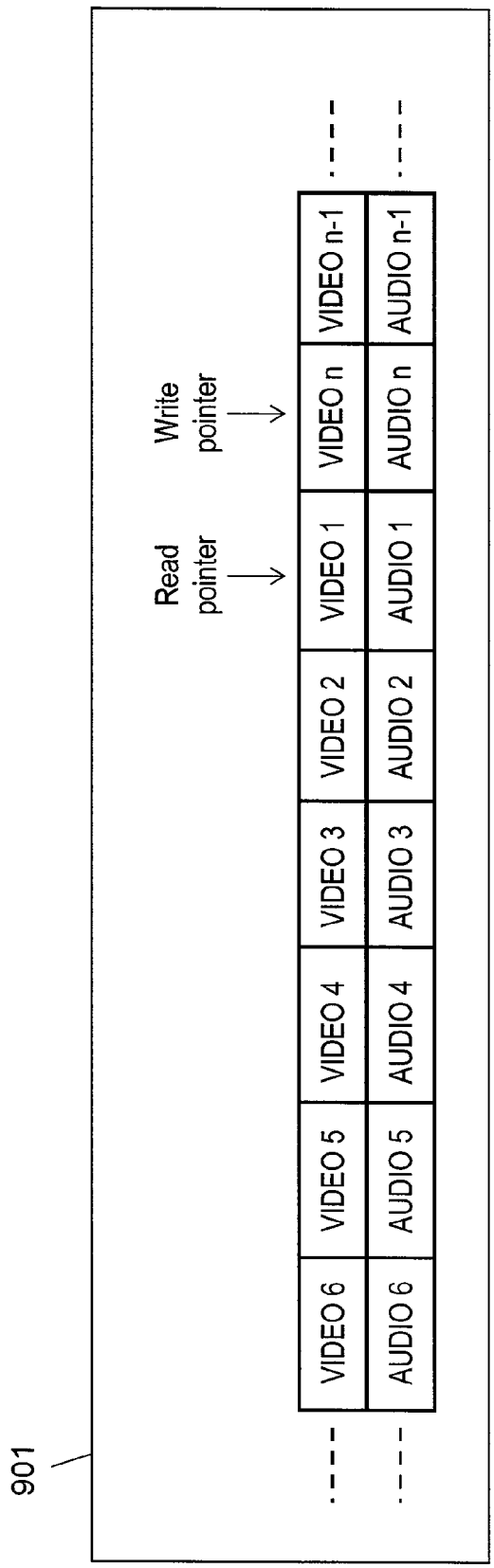
FIG. 13 is a schematic view showing a position relation between a read pointer and a write pointer when a delay amount of data of a video signal and an audio signal in the delay generator is maximum in accordance with the second exemplary embodiment of the present invention.

On the other hand, FIG. 13 shows the position relation between a read pointer and a write pointer when a delay amount of data of a video signal and an audio signal is maximum. In this case, since the difference between the memory position shown by the read pointer and the memory position shown by the write pointer is (n−1) memory, the delay amount is defined as (n−1).

A method in which delay controller 112 controls first delay generator 105 and second delay generator 106 in accordance with this exemplary embodiment is assumed to be the same as that in the first exemplary embodiment. Furthermore, the detail description of the block same as in the first exemplary embodiment is omitted.

As in the first exemplary embodiment, the audio delay amount detected by delay detector 811 is output to delay controller 812. Then, delay controller 812 stepwise controls first delay generator 805 and second delay generator 806 based on the obtained audio delay amount. Furthermore, delay controller 812 carries out control so that the delay amount in first delay generator 805 and second delay generator 806 becomes minimum, that is, one data immediately after one second has passed, that is, immediately after channel selection has been carried out. Thereafter, in order to minimize the difference of delay amount between the first video signal and first audio signal output from first delay generator 805 and the second video signal and second audio signal output from second delay generator 806, delay controller 812 carries out delay control so that the delay amount of the video signal and the audio signal in first delay generator 805 or second delay generator 806 is increased stepwise. As a result, according to the receiver of the present invention, immediately after channel selection, the first video signal and the first audio signal or the second video signal and the second audio signal are output respectively without delay. Therefore, it is possible to provide a receiver capable of synchronizing the video signal output and the audio signal output between a plurality of receivable broadcast methods.

Third Exemplary Embodiment

In the first exemplary embodiment, in order to control the delay amount of each delay generator, timing information is detected from the delay amount of the audio signal output from the AV decoder. A third exemplary embodiment is different from the first exemplary embodiment in that a first timing information signal is output from first AV decoder 1107 and a second timing information signal is output from second AV decoder 1108 in order to control the delay amount of each delay generator. Note here that detailed description of the same configurations and operations as those in the first exemplary embodiment are omitted.

Figure 14:
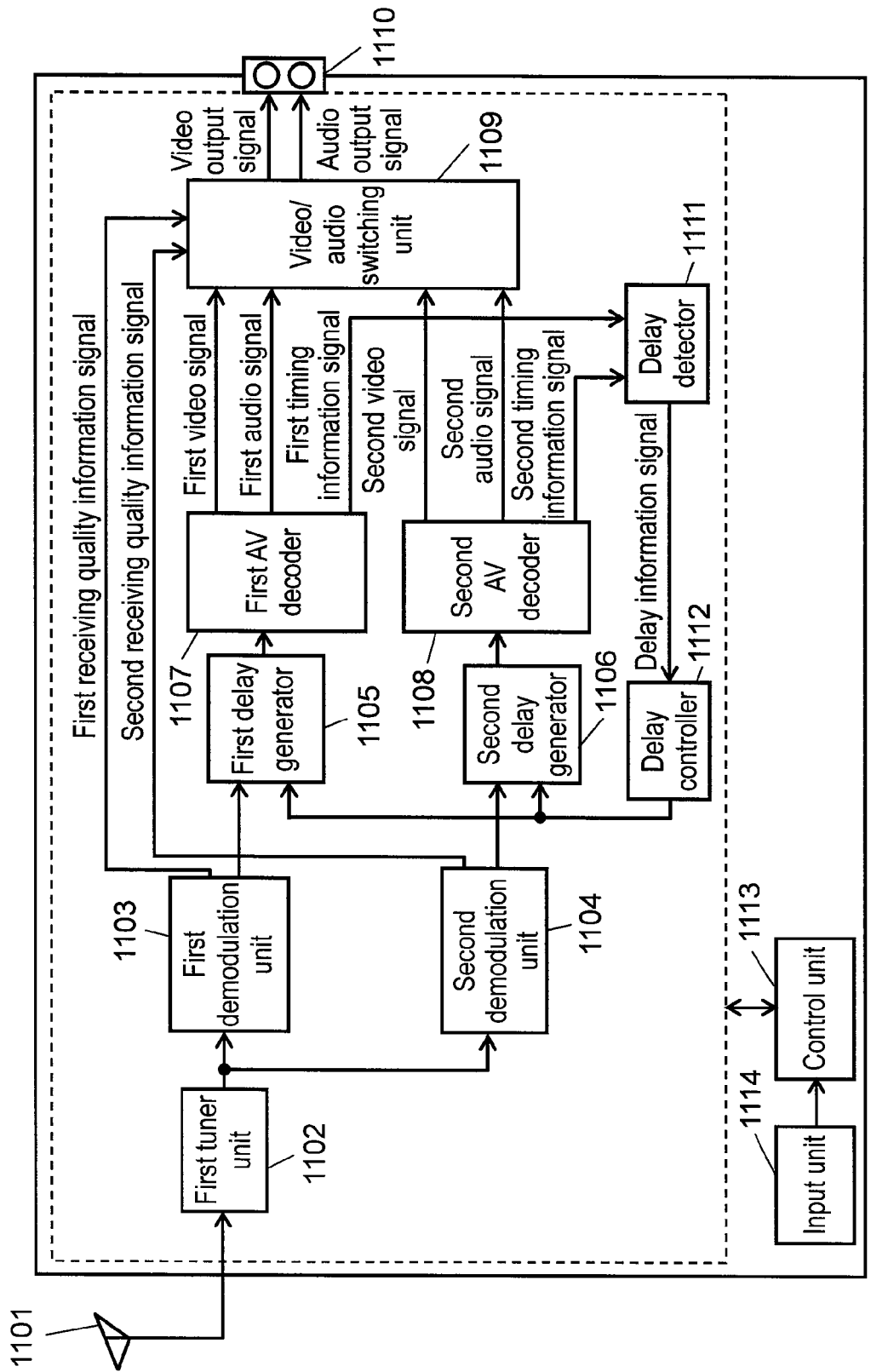
FIG. 14 is a block diagram showing a configuration of a receiver in accordance with a third exemplary embodiment of the present invention.

FIG. 14 is a block diagram showing a configuration of a receiver in accordance with the third exemplary embodiment. As shown in FIG. 14, the receiver of this exemplary embodiment includes first antenna 1101, first tuner unit 1102, first demodulation unit 1103, second demodulation unit 1104, first delay generator 1105, second delay generator 1106, first AV decoder 1107, second AV decoder 1108, video/audio switching unit 1109, video/audio output terminal 1110, delay detector 1111, delay controller 1112, control unit 1113, and input unit 1114.

Next, an operation of the thus configured receiver is described. First tuner unit 1102 channel-selects a received signal input from first antenna 1101, and outputs the selected signal to first demodulation unit 1103 and second demodulation unit 1104. First demodulation unit 1103 demodulates the selected signal output from first tuner unit 1102, and outputs a first transport stream signal to first delay generator 1105. Furthermore, first demodulation unit 1103 outputs a first receiving quality information signal that is calculated during demodulation to video/audio switching unit 1109. Second demodulation unit 1104 demodulates the selected signal output from first tuner unit 1102, and outputs a second transport stream signal to second delay generator 1106. Furthermore, second demodulation unit 1104 outputs a second receiving quality information signal calculated during demodulation to video/audio switching unit 1109.

First delay generator 1105 temporarily stores data of first transport stream signal decoded in first demodulation unit 1103 so as to generate transmission delay of data. Then, a first delay transport stream signal in which data transmission is delayed is outputted to first AV decoder 1107. Second delay generator 1106 temporarily stores data of the second transport stream signal decoded in second demodulation unit 1104 so as to generate transmission delay of data. Then, a second delay transport stream signal in which data transmission is delayed is outputted to second AV decoder 1108.

First AV decoder 1107 decodes the first delay transport stream signal output from first delay generator 1105, and outputs the decoded first video signal and first audio signal to video/audio switching unit 1109. Furthermore, first AV decoder 1107 outputs a first timing information signal to delay detector 1111. Second AV decoder 1108 decodes the second delay transport stream signal output from second delay generator 1106, and outputs the decoded second video signal and second audio signal to video/audio switching unit 1109. Furthermore, second AV decoder 1108 outputs a second timing information signal to delay detector 1111.

Video/audio switching unit 1109 receives inputs of the first video signal and first audio signal output from first AV decoder 1107 and the second video signal and second audio signal output from second AV decoder 1108, selects either the first video signal and first audio signal or the second video signal and second audio signal, and outputs it to video/audio output terminal 1110 based on the first receiving quality information signal and the second receiving quality information signal. Then, video/audio output terminal 1110 outputs a video signal and an audio signal to the outside of the receiver.

Delay detector 1111 receives an input of the first timing information signal and the second timing information signal output from first AV decoder 1107 and second AV decoder 1108, and detects the delay amount between the first video signal and the first audio signal, and the second video signal and the second audio signal. Then, delay detector 1111 outputs the detected delay amount to delay controller 1112 as a delay information signal.

Delay controller 1112 receives inputs of the delay information signal output from delay detector 1111 and controls first delay generator 1105 and second delay generator 1106. That is to say, delay controller 1112 controls the delay amount of data of the first transport stream signal in first delay generator 1105, and controls the delay amount of data of the second transport stream signal in second delay generator 1106.

Control unit 1113 controls and monitors the entire receiver. Specifically, control unit 1113 controls and monitors first tuner unit 1102, first demodulation unit 1103, second demodulation unit 1104, first delay generator 1105, second delay generator 1106, first AV decoder 1107, second AV decoder 1108, video/audio switching unit 1109, video/audio output terminal 1110, delay detector 1111 and delay controller 1112.

Input unit 1114 is a button, an infrared receiver, or the like used by a user when the user operates the receiver. The user's operation detected in the input unit is transmitted to control unit 1113.

The first timing information signal and the second timing information signal output from first AV decoder 1107 and second AV decoder 1108 can use, for example, PCR (Program Clock Reference) and the like for reproducing STC (System Time Clock) as a reference clock. Furthermore, in signals of two hierarchies decoded in first demodulation unit 1103 and second demodulation unit 1104, both video signals and the audio signals can be synchronized with each other by adjusting PTS (Presentation Time Stamp) showing the display timing to be added in the video signal and audio signal encoder.

Delay detector 1111 firstly calculates the difference between the first timing information signal output from first AV decoder 1107 and the second timing information signal output from second AV decoder 1108 when the delay amount of data of the transport stream signal in first delay generator 1105 and second delay generator 1106 is minimum. For example, it is assumed that the difference between the both PTSs is 5000 and the second video signal and second audio signal output from second AV decoder 1108 is detected to be delayed as compared with the first video signal and first audio signal output from first AV decoder 1107. In this case, delay detector 1111 receives inputs of the first timing information signal and the second timing information signal and calculates the difference of the data between the detected PTSs, and outputs the delay information signal to delay controller 1112. For example, when the calculated difference between PTSs, 5000, corresponds to 1000 packets and when one packet is 188 bytes, 188000 bytes of data are delayed by first delay generator 1105. Thus, the first video signal and the first audio signal output from first AV decoder 1107 and the second video signal and the second audio signal output from second AV decoder 1108 are synchronized with each other, respectively.

Specifically, similar to the first exemplary embodiment, delay controller 1112 firstly controls the delay amount in first delay generator 1105 and second delay generator 1106 to minimum data, that is, one datum immediately after channel selection.

Thereafter, delay controller 1112 carries out delay control so that the delay amount of data of the first transport stream signal in first delay generator 1105 or the delay amount of data of the second transport stream signal in second delay generator 1106 stepwise increases in order to minimize the difference of the delay amount between the first video signal and the first audio signal output from first delay generator 1105 and the second video signal and the second audio signal output from second delay generator 1106. As a result, the first video signal and the first audio signal or the second video signal and the second audio signal are output without delay immediately after channel selection.

Note here that in this exemplary embodiment, the delay generator is described as a different block from the AV decoder. However, a data buffer in the AV decoder may be used instead of the delay generator.

Furthermore, this exemplary embodiment includes two demodulation units, that is, first demodulation unit 103 and second demodulation unit 104 as shown in FIG. 14. However, the present invention can be applied to a configuration in which a plurality of hierarchies can be demodulated by a demodulation unit including one block.

Figure 15:
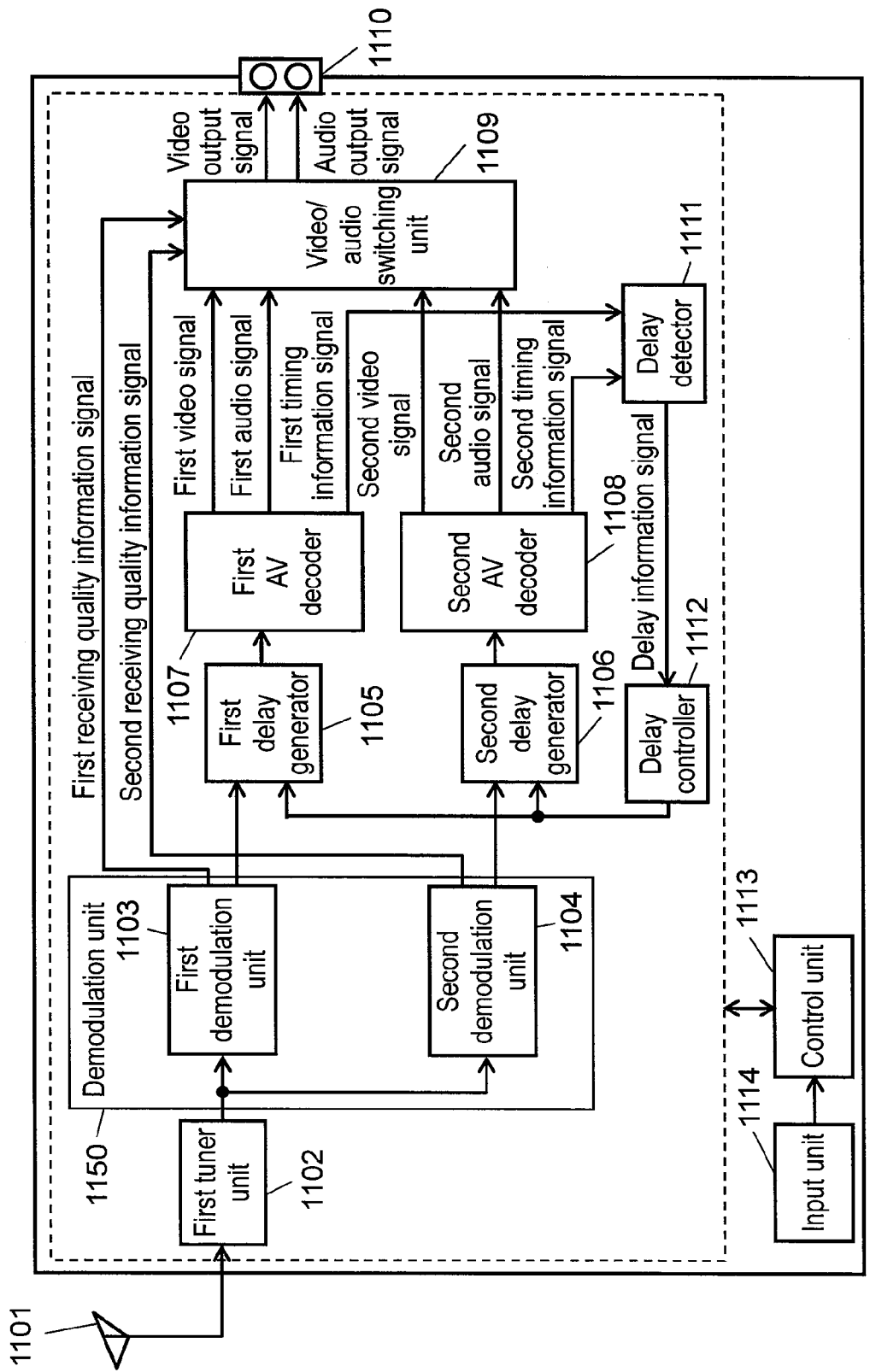
FIG. 15 is a block diagram showing another configuration of the receiver.

FIG. 15 is a block diagram showing another configuration of the receiver in this exemplary embodiment. Hereinafter, parts that are different from the configurations shown in FIG. 14 are mainly described. As shown in FIG. 15, the receiver includes at least first antenna 1101, first tuner unit 1102, and demodulation unit 1150 composed of first demodulation unit 1103 and second demodulation unit 1104.

In such a configuration, for example, first demodulation unit 1103 demodulates a signal in the 64 QAM hierarchy having a high transmission efficiency but low error resistance, and second demodulation unit 1104 demodulates a signal in the QPSK hierarchy having a low transmission efficiency but high error resistance. Demodulation unit 1150 can be designed as one LSI. Therefore, first demodulation unit 1103 can output a first transport stream in high bit-rate high-definition broadcast for fixed receiving and input it to first delay generator 1105. Furthermore, second demodulation unit 1104 can output a second transport stream in low bit-rate broadcast by a simplified picture image for mobile receiving, and input it to second delay generator 1106. Thus, even when signals of a plurality of different modulation methods are multiplied in the same physical channel, the same function as that of the receiver shown in FIG. 14 can be realized.

Note here that this exemplary embodiment described the case where signals modulated by two different modulation methods are multiplied in the same physical channel. However, by further providing a tuner unit, the present invention can be applied to a case where signals are transmitted by the different channels or a case where signals are arriving via different transmission paths.

Figure 16:
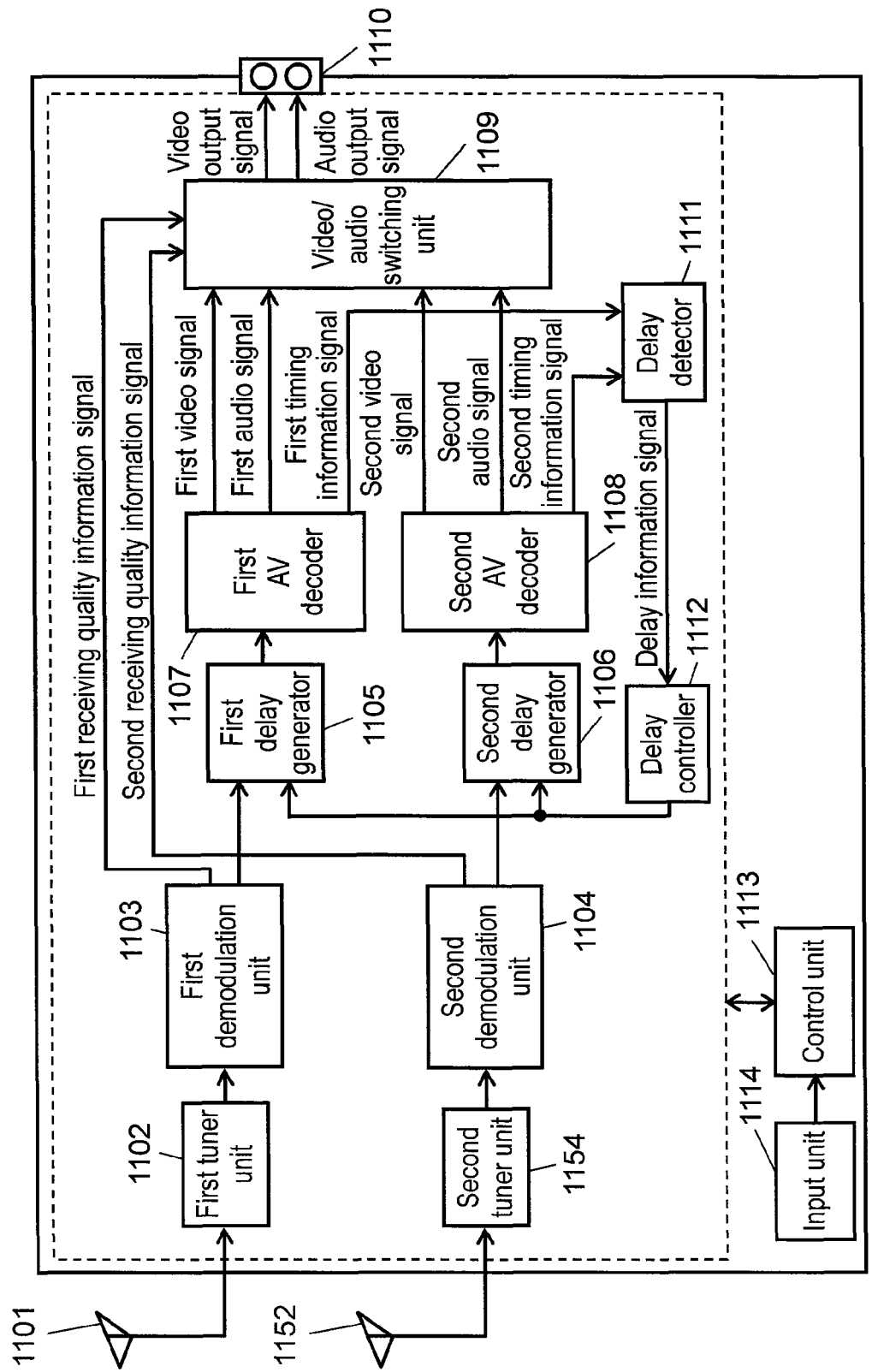
FIG. 16 is a block diagram showing a further configuration of the receiver.

FIG. 16 is a block diagram showing a further configuration of the receiver in accordance with this exemplary embodiment. Hereinafter, parts that are different from the configurations shown in FIG. 14 are mainly described. As shown in FIG. 16, the receiver includes at least first antenna 1101 for receiving a radio wave, and first tuner unit 1102 for channel-selecting the radio wave received by first antenna 1101 and outputting it as the channel-selected signal to first demodulation unit 1103. Furthermore, the receiver includes at least second antenna 1152 for receiving a radio wave, and second tuner unit 1154 for channel-selecting the radio wave received by second antenna 1152 and outputting it as the channel-selected signal to second demodulation unit 1104.

In such a configuration, for example, first antenna 1101 and second antenna 1152 can receive different channels of the terrestrial digital broadcast. Furthermore, first antenna 1101 may receive the terrestrial digital broadcast and second antenna 1152 may receive BS digital broadcast. Then, received signals output from first antenna 1101 and second antenna 1152 are input into first tuner unit 1102 and second tuner unit 1154 and channel-selected, respectively. Furthermore, each of the channel-selected signals is input into first demodulation unit 1103 and second demodulation unit 1104. Thus, even in a case where signals modulated by the different modulation methods are transmitted by the different channels or a case where signals are arriving via different transmission paths, since the same function as that of the receiver shown in FIG. 14 can be realized, the present invention can be applied.

In the receiver having a configuration shown in FIG. 16, signals received by first antenna 1101 and second antenna 1152 are not particularly limited to a modulation signal by a broadcast wave such as a terrestrial digital broadcast. For example, they may be modulation signals including video signals and audio signals by communication systems such as Wi-Fi (Wireless Fidelity) or potable wireless communication system or wireless LAN, and the like.

Thus, according to the receiver of the present invention, immediately after channel selection, the first video signal and the first audio signal or the second video signal and the second audio signal are output without delay. Therefore, it is possible to provide a receiver capable of synchronizing the video signal output and the audio signal output between a plurality of receivable broadcast methods.

Fourth Exemplary Embodiment

In the first exemplary embodiment, in order to control a delay amount of each delay generator, timing information is detected from the delay amount of audio signals output from an AV decoder. However, according to a fourth exemplary embodiment, an AV decoder outputs a delay information signal of a video signal and an audio signal. Note here that detailed description of the same configurations and operations as those in the first exemplary embodiment is omitted.

Figure 17:
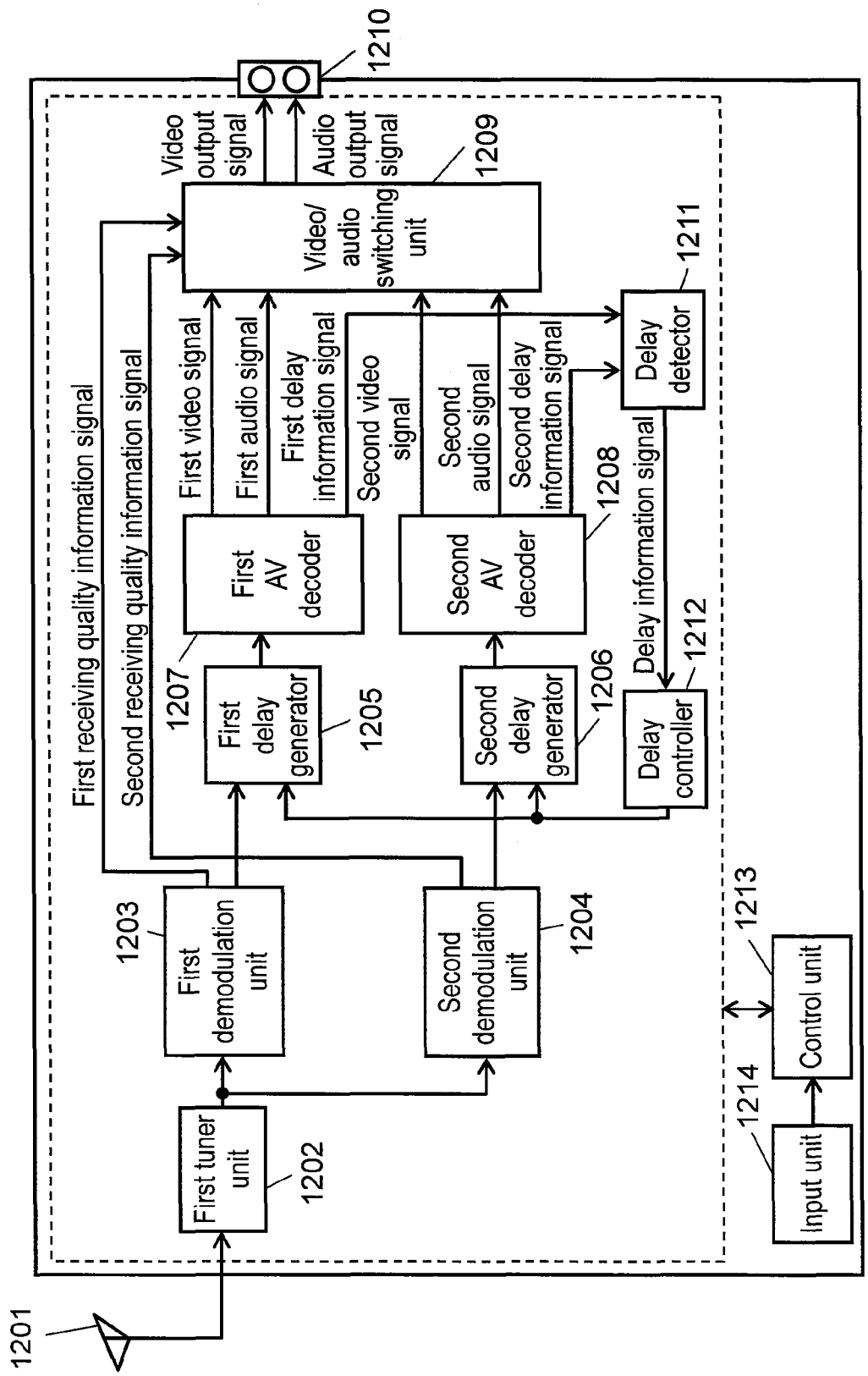
FIG. 17 is a block diagram showing a configuration of a receiver in accordance with a fourth exemplary embodiment of the present invention.

FIG. 17 is a block diagram showing a configuration of a receiver in accordance with the fourth exemplary embodiment. As shown in FIG. 17, the receiver of this exemplary embodiment includes first antenna 1201, first tuner unit 1202, first demodulation unit 1203, second demodulation unit 1204, first delay generator 1205, second delay generator 1206, first AV decoder 1207, second AV decoder 1208, video/audio switching unit 1209, video/audio output terminal 1210, delay detector 1211, delay controller 1212, control unit 1213 and input unit 1214.

Next, an operation of the thus configured receiver is described. First tuner unit 1202 channel-selects a received signal input from first antenna 1201, and outputs the channel-selected signal into first demodulation unit 1203 and second demodulation unit 1204. First demodulation unit 1203 demodulates the channel-selected signal output from first tuner unit 1202, and outputs a first transport stream signal to first AV decoder 1205. Furthermore, first demodulation unit 1203 outputs a first receiving quality information signal calculated during demodulation to video/audio switching unit 1209. Second demodulation unit 1204 demodulates the channel-selected signal output from first tuner unit 1202, and outputs a second transport stream signal to delay generator 1206. Furthermore, second demodulation unit 1204 outputs a second receiving quality information signal calculated during demodulation to video/audio switching unit 1209.

First delay generator 1205 temporarily stores data of a first transport stream signal decoded in first demodulation unit 1203 so as to generate a transmission delay of data. Then, a first delay transport stream signal in which data transmission is delayed is outputted to first AV decoder 1207. Second delay generator 1206 temporarily stores data demodulated by second demodulation unit 1204 so as to generate transmission delay of data. Then, second delay generator 1206 outputs a second delay transport stream signal in which data transmission is delayed is outputted to second AV decoder 1208.

First AV decoder 1207 decodes the first delay transport stream signal output from first delay generator 1205, and outputs the decoded first video signal and first audio signal to video/audio switching unit 1209. Furthermore, first AV decoder 1207 outputs the first delay information signal to delay detector 1211. Second AV decoder 1208 decodes the second delay transport stream signal output from second delay generator 1206, and outputs the decoded second video signal and second audio signal to video/audio switching unit 1209. Furthermore, second AV decoder 1208 outputs the second delay information signal to delay detector 1211.

Video/audio switching unit 1209 receives inputs of the first video signal and the first audio signal output from first AV decoder 1207 and the second video signal and the second audio signal output from second AV decoder 1208, selects either the first video signal and the first audio signal or the second video signal and the second audio signal, and outputs it to video/audio output terminal 1210, based on the first receiving quality information signal and the second receiving quality information signal. Then, a video signal and an audio signal are output from video/audio output terminal 1210 to the outside of the receiver.

Delay detector 1211 receives inputs of the first delay information signal output from first AV decoder 1207 and the second delay information signal output from second AV decoder 1208, and detects the delay amount between the first video signal and the first audio signal, and the second video signal and the second audio signal. Then, delay detector 1211 outputs the detected delay amount to delay controller 1212 as a delay information signal.

Delay controller 1212 receives an input of the delay information signal output from delay detector 1211, and controls first delay generator 1205 and second delay generator 1206. That is to say, delay controller 1212 controls the delay amount of data of the first transport stream signal in first delay generator 1205, and controls the delay amount of data of the second transport stream signal in second delay generator 1206.

Control unit 1213 controls and monitors the entire receiver. Specifically, control unit 1213 controls and monitors first tuner unit 1202, first demodulation unit 1203, second demodulation unit 1204, first delay generator 1205, second delay generator 1206, first AV decoder 1207, second AV decoder 1208, video/audio switching unit 1209, video/audio output terminal 1210, delay detector 1211 and delay controller 1212.

Input unit 1214 is a button, an infrared receiver, or the like used by a user when the user operates the receiver. The user's operation detected in the input unit is transmitted to control unit 1213.

The first delay information signal output from first AV decoder 1207 and the second delay information signal output from second AV decoder 1208 show the amount of delay between two systems of the video signals and the audio signals. An example of such information may include information showing how much delay occurs in the output signals after decoded of the video signals and audio signals with respect to the reference time information. By calculating the difference between them, it is possible to calculate delay and to determine which video signal and the audio signal are delayed.

This exemplary embodiment describes the case in which the first delay information signal and the second delay information signal are output from first AV decoder 1207 and second AV decoder 1208. However, the same effect can be obtained by using only one system of information, when a delay information signal of the only one system shows which video signal and the audio signal is delayed and how much delay occurs.

Delay detector 1211 firstly calculates the difference between the first delay information signal output from first AV decoder 1207 and the second delay information signal output from second AV decoder 1208 when the delay amount in first delay generator 1205 and second delay generator 1206 is minimum. For example, it is assumed that the difference between both delay information signals is 5000 in PTS and the second video signal and the second audio signal from second AV decoder 1208 is detected to be delayed as compared with the first video signal and the first audio signal from first AV decoder 1207. Delay detector 1211 receives inputs of the information and calculates the difference of the data between the detected PTSs, and outputs it to delay controller 1212. For example, when the value of PTS, that is the calculated difference of delay information signals, 5000, corresponds to 1000 packets. When one packet is 188 bytes, 188000 bytes of data are delayed by first delay generator 1205. Thus, the first video signal and the first audio signal output from first AV decoder 1207 and the second video signal and second audio signal output from second AV decoder 1208 are synchronized with each other, respectively. Then, as in the first exemplary embodiment, delay controller 1212 controls the delay amount of the first video signal and the first audio signal output from first delay generator 1205 and the second video signal and the second audio signal output from second delay generator 1206 to minimum, one datum, immediately after channel selection. Thereafter, when delay controller 1212 carries out delay control so that the delay amount in first delay generator 1205 or in second delay generator 1206 stepwise increases in order to minimize the difference of the delay amount between the first video signal and the first audio signal output from first delay generator 1205 and the second video signal and the second audio signal output from second delay generator 1206. As a result, the first video signal and the first audio signal or the second video signal and the second audio signal are output without delay immediately after channel selection.

Note here that in this exemplary embodiment, the delay generator is described as a different block from the AV decoder. However, a data buffer in the AV decoder may be used instead of the delay generator.

Furthermore, this exemplary embodiment includes two demodulation units, that is, first demodulation unit 1203 and second demodulation unit 1204 as shown in FIG. 17. However, the present invention can be applied to a configuration in which a plurality of hierarchies can be demodulated by a demodulation unit including one block.

Figure 18:
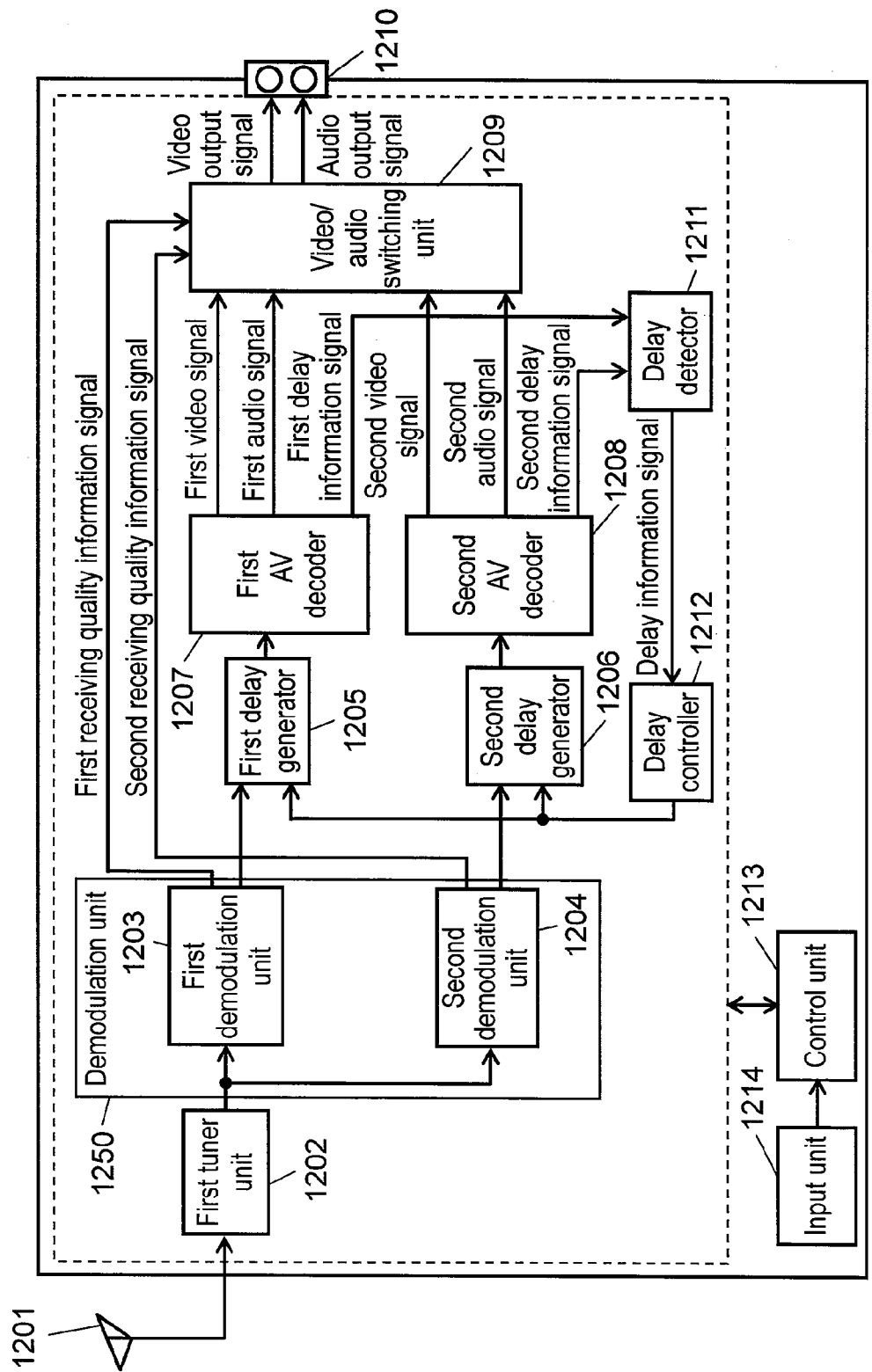
FIG. 18 is a block diagram showing another configuration of the receiver.

FIG. 18 is a block diagram showing another configuration of the receiver in this exemplary embodiment. Hereinafter, parts that are different from the configurations shown in FIG. 17 are mainly described. As shown in FIG. 18, the receiver includes at least first antenna 1201, first tuner unit 1202, and demodulation unit 1250 composed of first demodulation unit 1203 and second demodulation unit 1204.

In such a configuration, for example, first demodulation unit 1203 demodulates a signal in the 64 QAM hierarchy having a high transmission efficiency but low error resistance, and second demodulation unit 1204 demodulates a signal in the QPSK hierarchy having a low transmission efficiency but high error resistance. Then, demodulation unit 1250 can be designed as one LSI. Therefore, first demodulation unit 1203 can output a first transport stream in high bit-rate high-definition broadcast for fixed receiving and input it to first delay generator 1205. Furthermore, second demodulation unit 1204 can output a second transport stream low bit-rate broadcast by a simplified picture image for mobile receiving, and input it to second delay generator 1206. Thus, even when signals of a plurality of different modulation methods are multiplied in the same physical channel, the same function as that of the receiver shown in FIG. 17 can be realized.

Note here that this exemplary embodiment described the case where signals modulated by two different modulation methods are multiplied in the same physical channel. However, by further providing a tuner unit, the present invention can be applied to a case where signals are transmitted by the different channels or a case where signals are arriving via different transmission paths.

Figure 19:
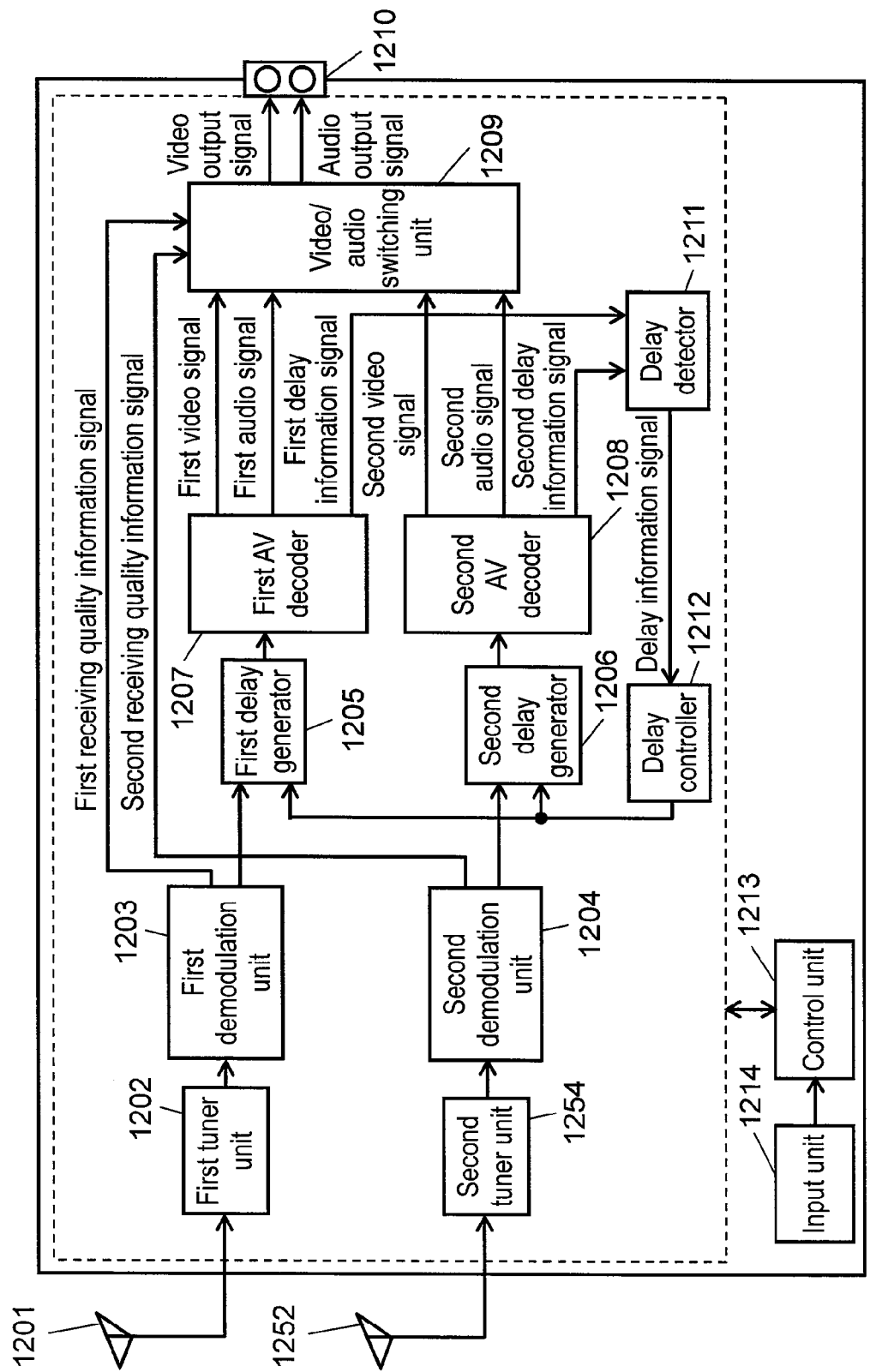
FIG. 19 is a block diagram showing a further configuration of the receiver.
Figure 20:
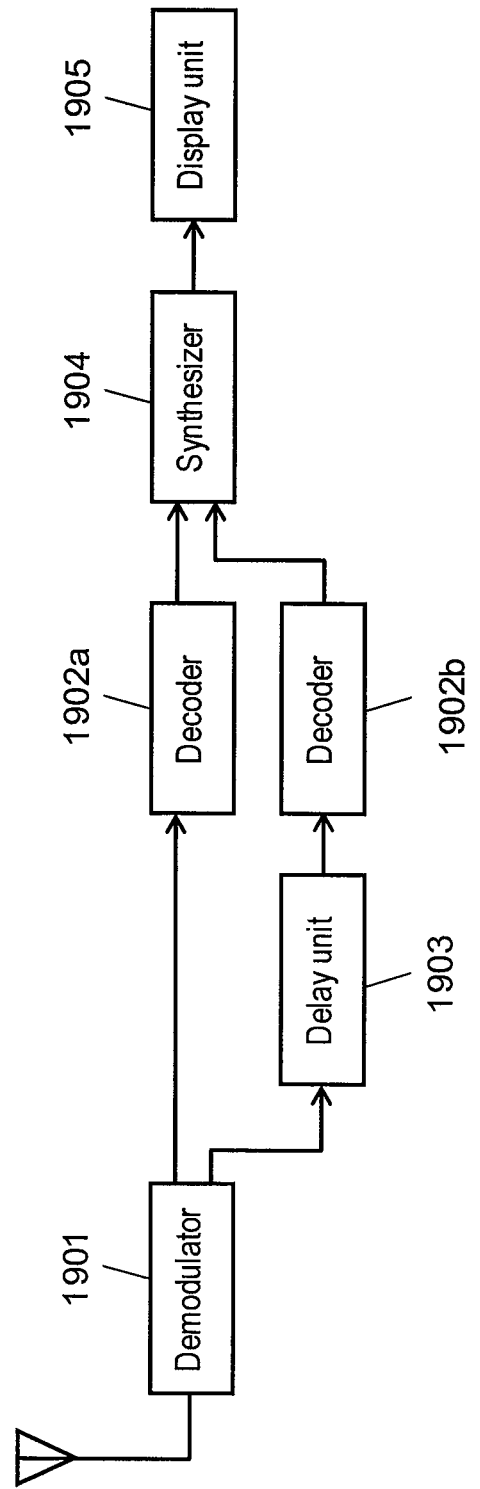
FIG. 20 is a block diagram showing a configuration of a conventional digital broadcasting receiver.

FIG. 19 is a block diagram showing a further configuration of the receiver in accordance with this exemplary embodiment. Hereinafter, parts that are different from the configurations shown in FIG. 17 are mainly described. As shown in FIG. 19, the receiver includes at least first antenna 1201 for receiving a radio wave, and first tuner unit 1202 for channel-selecting the radio wave received by first antenna 1201 and outputting it as the channel-selected signal to first demodulation unit 1203. Furthermore, the receiver includes at least second antenna 1252 for receiving a radio wave, and second tuner unit 1254 for channel-selecting the radio wave received by second antenna 1252 and outputting it as the channel-selected signal to second demodulation unit 1204.

In such a configuration, for example, first antenna 1201 and second antenna 1252 can receive different channels of a terrestrial digital broadcast. Furthermore, first antenna 1201 may receive the terrestrial digital broadcast and second antenna 1252 may receive BS digital broadcast. Then, received signals output from first antenna 1201 and second antenna 1252 are input into first tuner unit 1202 and second tuner unit 1254 and channel-selected, respectively. Furthermore, each of the channel-selected signals is input into first demodulation unit 1203 and second demodulation unit 1204. Thus, even in a case where signals modulated by the different modulation methods are transmitted by the different channels or a case where signals are arriving via different transmission paths, since the same function as that of the receiver shown in FIG. 17 can be realized, the present invention can be applied.

In the receiver having a configuration shown in FIG. 19, signals received by first antenna 1201 and second antenna 1252 are not particularly limited to a modulation signal by a broadcast wave such as a terrestrial digital broadcast. For example, they may be modulation signals including video signals and audio signals by communication systems such as Wi-Fi (Wireless Fidelity) or potable wireless communication system or wireless LAN, and the like.

Thus, according to the receiver of the present invention, immediately after channel selection, the first video signal and the first audio signal or the second video signal and the second audio signal are output without delay. Therefore, it is possible to provide a receiver capable of synchronizing the video signal output and the audio signal output between a plurality of receivable broadcast methods or communication methods.

INDUSTRIAL APPLICABILITY

As mentioned above, according to the present invention, a video signal output and a audio signal output can be synchronized between a plurality of receivable broadcast methods between the same programs broadcasted by a plurality of receivable broadcast methods, and a video signal and an audio signal can be output without delay immediately after channel selection. Thus, the receiver of the present invention is useful as a digital broadcast receiver, and the like.

The invention claimed is:

1. A receiver comprising:
a demodulation unit for demodulating a channel-selected signal, outputting a first transport stream signal and a second transport stream signal, and determining a receiving quality and outputting it as a receiving quality information signal;
a first delay generator for delaying the first transport stream signal by a first transmission time delay, and outputting the delayed first transport stream signal as a first delay transport stream signal;
a second delay generator for delaying the second transport stream signal by a second transmission time delay and outputting the delayed second transport stream signal as a second delay transport stream signal;
a first AV decoder for decoding the second delay transport stream signal and outputting a first video signal and a first audio signal decoded from the second delay transport stream;
a second AV decoder for decoding the first delay transport stream signal and outputting a second video signal and a second audio signal decoded from the first delay transport stream;
an video/audio switching unit for inputting of the first video signal and the first audio signal, and the second video signal and the second audio signal, selecting any of the first video signal and the first audio signal, and the second video signal and the second audio signal, and outputting a video signal and an audio signal based on the receiving quality information signal;

a delay detector for inputting of the first audio signal and the second audio signal, detecting an amount of audio time delay between the first audio signal and the second audio signal, and outputting the amount of audio time delay as a delay amount signal; and a delay controller for receiving an input of the delay amount signal and controlling the first delay generator and the second delay generator based on the delay amount signal;

wherein the delay controller stepwise increases the first transmission time delay to the first transport stream signal in the first delay generator or the second transmission time delay to the second transport stream signal in the second delay generator to reduce the amount of audio time delay between the first audio signal and the second audio signal.

2. The receiver of claim 1, further comprising a tuner unit for channel-selecting a received broadcast wave and outputting it as the channel-selected signal:

wherein immediately after channel selection, a delay amount of the first transport stream signal in the first delay generator and a delay amount of the second transport stream signal in the second delay generator are both minimum.

3. The receiver of claim 1, wherein
the demodulation unit includes a first demodulation unit and a second demodulation unit;
the receiving quality signal includes a first receiving quality information signal and a second receiving quality information signal;
the first demodulation unit outputs the first transport stream signal and the first receiving quality signal; and
the second demodulation unit outputs the second transport stream signal and the second receiving quality signal.

4. The receiver of claim 3, further comprising:
a first antenna for receiving a radio wave;
 a first tuner unit for channel-selecting the radio wave received by the first antenna and outputting it as a first channel-selected signal to the first demodulation unit;
 a second antenna for receiving a radio wave; and
a second tuner unit for channel-selecting the radio wave received by the second antenna and outputting it as a second channel-selected signal to the second demodulation unit.

5. The receiver of claim 1, wherein the first delay generator and the second delay generator rewrite a time stamp described in the first transport stream signal and the second transport stream signal.

6. The receiver of claim 1, wherein the delay detector stops detecting the audio delay amount for a predetermined period when it is judged that any of the first audio signal and the second audio signal is silent for a certain time.

7. The receiver of claim 1, wherein the delay detector detects the audio delay amount when a change amount of a level of the first audio signal or the second audio signal exceeds a predetermined value.

8. The receiver of claim 1, wherein the delay detector detects the audio delay amount after average amounts of sound of the first audio signal and the second audio signal are adjusted.

9. The receiver of claim 1, wherein the delay detector compares the first audio signal and the second audio signal with each other after a specific frequency band is extracted, and detects the audio delay amount.

10. The receiver of claim 1, wherein the delay detector carries out detection at a predetermined cycle and detects the audio delay amount.

11. The receiver of claim 1, wherein the video/audio switching unit carries out a switching between the first video signal and the second video signal and a switching between the first audio signal and the second audio signal at different timings.

12. The receiver of claim 11, wherein the video/audio switching unit carries out the switching of the audio signal output from the video/audio switching unit at a timing at which the audio signal passes through a zero-cross point or during a silent period.

13. The receiver of claim 11, wherein the video/audio switching unit carries out the switching of the video signal output from the video/audio switching unit at a time when a scene is changed or during a blanking period of the video signal.

14. The receiver of claim 1, wherein the receiving quality information is any one of packet error information, packet absence information, bit error information, and CN ratio information.

15. A receiver comprising:
a demodulation unit for demodulating a channel-selected signal, outputting a first transport stream signal and a second transport stream signal, and determining a receiving quality and outputting it as a receiving quality information signal;
a first delay generator for delaying the first transport stream signal by a first transmission time delay and outputting the delayed first transport stream signal as a first delay transport stream signal;
a second delay generator for delaying the second transport stream signal by a second transmission time delay and outputting the delayed second transport stream signal as a second delay transport stream signal;
a first AV decoder for decoding the first delay transport stream signal, outputting a first video signal and a first audio signal decoded from the first delay transport stream, and outputting any one of a first timing information signal and a first delay information signal;
a second AV decoder for decoding the second delay transport stream signal, outputting a second video signal and a second audio signal decoded from the second delay transport stream, and outputting any of a second timing information signal and a second delay information signal;
an video/audio switching unit for selecting any of the first video signal and the first audio signal, and the second video signal and the second audio signal, and outputting a video signal and an audio signal based on the receiving quality information signal;
a delay detector for inputting of the first timing information signal and the second timing information signal or the first delay information signal and the second delay information signal, detecting an amount of time delay between the first video signal and the first audio signal, and the second video signal and the second audio signal, and outputting it as a delay amount signal; and
a delay controller for receiving an input of the delay amount and controlling the first delay generator and the second delay generator based on the delay amount,
wherein the delay controller stepwise increases the first transmission time delay to the first transport stream signal in the first delay generator or the second transmission time delay to the second transport stream signal in the second delay generator to reduce the amount of time delay between the first audio signal and the second audio signal.

* * * * *